(12) United States Patent
Zehner et al.

(10) Patent No.: US 7,012,600 B2
(45) Date of Patent: Mar. 14, 2006

(54) METHODS FOR DRIVING BISTABLE ELECTRO-OPTIC DISPLAYS, AND APPARATUS FOR USE THEREIN

(75) Inventors: Robert W. Zehner, Somerville, MA (US); Holly G. Gates, Somerville, MA (US); Karl R. Amundson, Cambridge, MA (US); Joanna F. Au, Boston, MA (US); Ara N. Knalan, Cambridge, MA (US); Jonathan L. Zalesky, Cambridge, MA (US); Alexi C. Arango, Somerville, MA (US)

(73) Assignee: E Ink Corporation, Cambridge, MA (US)

( * ) Notice: Subject to any disclaimer, the term of this patent is extended or adjusted under 35 U.S.C. 154(b) by 133 days.

(21) Appl. No.: 10/065,795

(22) Filed: Nov. 20, 2002

(65) Prior Publication Data

US 2003/0137521 A1 Jul. 24, 2003

Related U.S. Application Data

(63) Continuation-in-part of application No. 09/561,424, filed on Apr. 28, 2000, now Pat. No. 6,531,997, which is a continuation-in-part of application No. 09/520,743, filed on Mar. 8, 2000, now Pat. No. 6,504,524.

(60) Provisional application No. 60/319,007, filed on Nov. 20, 2001, provisional application No. 60/319,010, filed on Nov. 21, 2001, provisional application No. 60/319,034, filed on Dec. 18, 2001, provisional application No. 60/319,037, filed on Dec. 20, 2001, provisional application No. 60/319,040, filed on Dec. 21, 2001, and provisional application No. 60/131,790, filed on Apr. 30, 1999.

(51) Int. Cl.
   *H04N 1/46* (2006.01)

(52) U.S. Cl. ............... 345/214; 345/36; 345/48; 345/63; 345/77; 345/84; 345/89; 345/204; 345/210; 345/690; 345/691; 358/455; 358/519; 382/169

(58) Field of Classification Search .......... 345/36, 345/48, 63, 77, 84, 89, 204, 210, 214, 690, 345/691, 42, 45, 76, 78, 107, 205; 359/455, 359/519; 382/169; 358/1.9, 455, 519
See application file for complete search history.

(56) References Cited

U.S. PATENT DOCUMENTS 3,657,653 A * 4/1972 Wilkinson .......... 375/246
3,668,106 A   6/1972 Ota .................. 358/305

(Continued)

FOREIGN PATENT DOCUMENTS

JP    03-091722 A    4/1991
JP    03-096925 A    4/1991

(Continued)

OTHER PUBLICATIONS

Amundson, K., etal., "Flexible, Active–Matrix Display Constructed Using a Microencapsulated Electrophoretic Material and an Organic–Semiconductor–Based Backplane", SID 01 Digest, 160 (Jun. 2001).

(Continued)

*Primary Examiner*—Bipin Shalwala
*Assistant Examiner*—Vincent E. Kovalick
(74) *Attorney, Agent, or Firm*—David J. Cole

(57) ABSTRACT

A bistable electro-optic display has a plurality of pixels, each of which is capable of displaying at least three gray levels. The display is driven by a method comprising: storing a look-up table containing data representing the impulses necessary to convert an initial gray level to a final gray level; storing data representing at least an initial state of each pixel of the display; receiving an input signal representing a desired final state of at least one pixel of the display; and generating an output signal representing the impulse necessary to convert the initial state of said one pixel to the desired final state thereof, as determined from said look-up table. The invention also provides a method for reducing the remnant voltage of an electro-optic display.

66 Claims, 10 Drawing Sheets

U.S. PATENT DOCUMENTS

| | | | |
|---|---|---|---|
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,041,481 A | 8/1977 | Sato | 340/324 M |
| 4,450,440 A | 5/1984 | White | 345/35 |
| 4,741,604 A | 5/1988 | Kornfeld | 359/296 |
| 4,746,917 A | 5/1988 | DiSanto et al. | 345/107 |
| 4,833,464 A | 5/1989 | DiSanto et al. | 345/107 |
| 4,947,157 A | 8/1990 | DiSanto et al. | 345/107 |
| 4,947,159 A | 8/1990 | DiSanto et al. | 345/107 |
| 5,066,946 A | 11/1991 | DiSanto et al. | 345/107 |
| 5,223,115 A | 6/1993 | DiSanto et al. | 359/238 |
| 5,247,290 A | 9/1993 | DiSanto et al. | 345/107 |
| 5,254,981 A | 10/1993 | DiSanto et al. | 345/107 |
| 5,261,010 A * | 11/1993 | Lo et al. | 382/216 |
| 5,266,937 A | 11/1993 | DiSanto et al. | 345/107 |
| 5,293,528 A | 3/1994 | DiSanto et al. | 345/107 |
| 5,302,235 A | 4/1994 | DiSanto et al. | 216/5 |
| 5,359,346 A | 10/1994 | DiSanto et al. | 345/107 |
| 5,412,398 A | 5/1995 | DiSanto et al. | 345/107 |
| 5,467,107 A | 11/1995 | DiSanto et al. | 345/107 |
| 5,499,038 A | 3/1996 | DiSanto et al. | 345/107 |
| 5,586,055 A * | 12/1996 | Ng et al. | 702/90 |
| 5,604,584 A * | 2/1997 | Iwasaki | 356/218 |
| 5,604,616 A * | 2/1997 | Dunn et al. | 349/168 |
| 5,615,016 A * | 3/1997 | Thakur et al. | 358/3.26 |
| 5,654,732 A | 8/1997 | Katakura | 345/95 |
| 5,684,501 A | 11/1997 | Knapp et al. | 345/94 |
| 5,689,282 A | 11/1997 | Wolfs et al. | 345/100 |
| 5,717,515 A | 2/1998 | Sheridon | 359/296 |
| 5,739,801 A | 4/1998 | Sheridon | 345/84 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,866,284 A | 2/1999 | Vincent | 430/37 |
| 5,892,504 A | 4/1999 | Knapp | 345/204 |
| 5,896,117 A | 4/1999 | Moon | 345/95 |
| 5,930,026 A | 7/1999 | Jacobson et al. | 359/256 |
| 5,933,203 A | 8/1999 | Wu et al. | 349/35 |
| 5,961,804 A | 10/1999 | Jacobson et al. | 204/606 |
| 5,963,456 A | 10/1999 | Klein et al. | 364/496 |
| 5,978,052 A | 11/1999 | Ilcisin et al. | 348/797 |
| 6,002,384 A | 12/1999 | Tamai et al. | 345/95 |
| 6,017,584 A | 1/2000 | Albert et al. | 427/313.3 |
| 6,034,807 A | 3/2000 | Little et al. | 359/227 |
| 6,045,955 A | 4/2000 | Vincent | 430/45 |
| 6,054,071 A | 4/2000 | Mikkelsen, Jr. | 264/1.36 |
| 6,055,091 A | 4/2000 | Sheridon et al. | 359/296 |
| 6,055,180 A | 4/2000 | Gudesen et al. | 365/175 |
| 6,057,814 A | 5/2000 | Kalt | 345/58 |
| 6,064,410 A | 5/2000 | Wen et al. | 347/111 |
| 6,067,185 A | 5/2000 | Albert et al. | 359/296 |
| 6,081,285 A | 6/2000 | Wen et al. | 347/111 |
| 6,097,531 A | 8/2000 | Sheridon | 359/296 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,147,791 A | 11/2000 | Sheridon | 359/296 |
| 6,154,190 A | 11/2000 | Yang et al. | 345/94 |
| 6,177,921 B1 | 1/2001 | Comiskey et al. | 345/107 |
| 6,232,950 B1 | 5/2001 | Albert et al. | 345/107 |
| 6,236,385 B1 | 5/2001 | Nomura et al. | 345/95 |
| 6,239,896 B1 | 5/2001 | Ikeda | 359/240 |
| 6,241,921 B1 | 6/2001 | Jacobson et al. | 264/1.36 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,300,932 B1 | 10/2001 | Albert | 345/107 |
| 6,301,038 B1 | 10/2001 | Fitzmaurice et al. | 359/265 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,330,054 B1 | 12/2001 | Ikami | 355/400 |
| 6,348,908 B1 | 2/2002 | Richley et al. | 345/85 |
| 6,359,605 B1 | 3/2002 | Knapp et al. | 345/76 |
| 6,376,828 B1 | 4/2002 | Comiskey | 250/216 |
| 6,377,387 B1 | 4/2002 | Duthaler et al. | 359/296 |
| 6,392,786 B1 | 5/2002 | Albert | 359/296 |
| 6,413,790 B1 | 7/2002 | Duthaler et al. | 438/21 |
| 6,421,033 B1 | 7/2002 | Williams et al. | 345/55 |
| 6,445,489 B1 | 9/2002 | Jacobson et al. | 359/296 |
| 6,459,418 B1 | 10/2002 | Comiskey et al. | 345/107 |
| 6,462,837 B1 * | 10/2002 | Tone | 358/3.01 |
| 6,473,072 B1 | 10/2002 | Comiskey et al. | 345/173 |
| 6,498,114 B1 | 12/2002 | Amundson et al. | 438/780 |
| 6,504,524 B1 | 1/2003 | Gates et al. | 345/107 |
| 6,506,438 B1 | 1/2003 | Duthaler et al. | 427/58 |
| 6,515,649 B1 | 2/2003 | Albert et al. | 345/107 |
| 6,518,949 B1 | 2/2003 | Drzaic | 345/107 |
| 6,531,997 B1 | 3/2003 | Gates et al. | 345/107 |
| 6,535,197 B1 | 3/2003 | Comiskey et al. | 345/107 |
| 6,538,801 B1 | 3/2003 | Jacobson et al. | 359/296 |
| 6,545,291 B1 | 4/2003 | Amundson et al. | 257/40 |
| 6,580,545 B1 | 6/2003 | Morrison et al. | 359/265 |
| 6,608,701 B1 * | 8/2003 | Loce et al. | 358/3.09 |
| 2001/0045934 A1 | 11/2001 | Turner et al. | 345/107 |
| 2002/0005722 A1 * | 1/2002 | Morita | 324/523 |
| 2002/0019081 A1 | 2/2002 | Denis et al. | 438/149 |
| 2002/0021270 A1 | 2/2002 | Albert | 345/84 |
| 2002/0053900 A1 | 5/2002 | Jacobson et al. | 324/100 |
| 2002/0060321 A1 | 5/2002 | Kazlas et al. | 257/66 |
| 2002/0063661 A1 | 5/2002 | Comiskey et al. | 345/55 |
| 2002/0075556 A1 | 6/2002 | Liang et al. | 359/296 |
| 2002/0090980 A1 | 7/2002 | Wilcox et al. | 455/566 |
| 2002/0106847 A1 | 8/2002 | Kazlas et al. | 438/200 |
| 2002/0113770 A1 | 8/2002 | Jacobson et al. | 345/107 |
| 2002/0130832 A1 | 9/2002 | Baucom et al. | 345/107 |
| 2002/0131471 A1 | 9/2002 | Paolini, Jr. et al. | 359/296 |
| 2002/0171910 A1 | 11/2002 | Pullen et al. | 359/296 |
| 2002/0180687 A1 | 12/2002 | Webber | 345/107 |
| 2002/0180688 A1 | 12/2002 | Drzaic et al. | 345/107 |
| 2002/0185378 A1 | 12/2002 | Honeyman et al. | 204/601 |
| 2003/0011560 A1 | 1/2003 | Albert et al. | 345/107 |
| 2003/0011867 A1 | 1/2003 | Loxley | 359/296 |
| 2003/0011868 A1 | 1/2003 | Zehner et al. | 359/296 |
| 2003/0020844 A1 | 1/2003 | Albert et al. | 349/33 |
| 2003/0025855 A1 | 2/2003 | Holman et al. | 349/86 |
| 2003/0038755 A1 | 2/2003 | Amundson et al. | 345/15 |
| 2003/0053189 A1 | 3/2003 | Goenaga et al. | 359/296 |
| 2003/0076573 A1 | 4/2003 | Gates et al. | 359/296 |
| 2003/0096113 A1 | 5/2003 | Jacobson et al. | 428/379 |
| 2003/0102858 A1 | 6/2003 | Jocobson et al. | 324/158.1 |

FOREIGN PATENT DOCUMENTS

| | | |
|---|---|---|
| JP | 05-173194 A | 7/1993 |
| JP | 06-233131 A | 8/1994 |
| JP | 11-113019 A | 4/1999 |
| JP | 2000-221546 | 8/2000 |
| WO | WO 99/10870 | 3/1999 |
| WO | WO 99/67678 | 12/1999 |
| WO | WO 00/05704 | 2/2000 |
| WO | WO 00/20922 | 4/2000 |

| | | |
|---|---|---|
| WO | WO 00/26761 | 5/2000 |
| WO | WO 00/36560 | 6/2000 |
| WO | WO 00/38000 | 6/2000 |
| WO | WO 00/38001 | 6/2000 |
| WO | WO 00/67110 | 11/2000 |
| WO | WO 00/67327 | 11/2000 |
| WO | WO 01/02899 | 1/2001 |
| WO | WO 01/07961 | 2/2001 |
| WO | WO 01/08241 | 2/2001 |
| WO | WO 01/27690 | 4/2001 |
| WO | WO 02/01281 | 1/2002 |

OTHER PUBLICATIONS

Antia, M., "Switchable Reflections Make Electronic Ink", Science, 285, 658 (1999).

Bach, U., et al., "Nanomaterials–Based Electrochromics for Paper–Quality Displays", Adv. Mater, 14(11), 845 (2002).

Chen, Y., et al., "A Conformable Electronic Ink Display using a Foil–Based a–Si TFT Array", SID 01 Digest, 157 (Jun. 2001).

Comiskey, B., et al., "An electrophoretic ink for all–printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active–Matrix Color Displays Using Electrophoretic Ink and Color Filters", SID 02 Digest, 1374 (2002).

Jacobson, J., et al., "The last book", IBM Systems J., 36, 457 (1997).

Kazlas, P., et al., "12.1" SVGA Microencapsulated Electrophoretic Active Matrix Display for Information Appliances, SID 01 Digest, 152 (Jun. 2001).

Mossman, M.A., et al., "A New Reflective Color Display Technique Based on Total Internal Reflection and Substractive Color Filtering", SID 01 Digest, 1054 (2001).

Pitt, M.G., et al., "Power Consumption of Microencapsulated Electrophoretic Displays for Smart Handheld Applications", SID 02 Digest, 1378 (2002).

Poor, A., "Feed forward makes LCDs Faster", available at "http://www.extremetech.com/article2/0,3973,10085, 00.asp".

Shiffman, R.R., et al., "An Electrophoretic Image Display with Internal NMOS Address Logic and Display Drivers," Proceedings of the SID, 1984, vol. 25, 105 (1984).

Singer, B., et al., "An X–Y Addressable Electrophoretic Display," Proceedings of the SID, 18, 255 (1977).

Webber, R., "Image Stability in Active–Matrix Microencapsulated Electrophoretic Displays", SID 02 Digest, 126 (2002).

Wood, D., Information Display, 18(3), 24 (Mar. 2002).

* cited by examiner

METHODS FOR DRIVING BISTABLE ELECTRO-OPTIC DISPLAYS, AND APPARATUS FOR USE THEREIN

CROSS REFERENCE TO RELATED APPLICATIONS

This application claims priority from the following Provisional Applications: (a) Ser. No. 60/319,007, filed Nov. 20, 2001; (b) Ser. No. 60/319,010, filed Nov. 21, 2001; (c) Ser. No. 60/319,034, filed Dec. 18, 2001; (d) Ser. No. 60/319,037, filed Dec. 20, 2001; and (e) Ser. No. 60/319,040, filed Dec. 21, 2001. This application is also a continuation-in-part of application Ser. No. 09/561,424, filed Apr. 28, 2000 (now U.S. Pat. No. 6,531,997), which is itself a continuation-in-part of application Ser. No. 09/520,743, filed Mar. 8, 2000 (now U.S. Pat. No. 6,504,524). application Ser. No. 09/561,424 also claims priority from application Ser. No. 60/131,790, filed Apr. 30, 1999. The entire contents of the aforementioned applications are herein incorporated by reference.

BACKGROUND OF INVENTION

This invention relates to methods for driving bistable electro-optic displays, and to apparatus for use in such methods. More specifically, this invention relates to driving methods and apparatus controller which are intended to enable more accurate control of gray states of the pixels of an electro-optic display. This invention also relates to a method which enables long-term direct current (DC) balancing of the driving impulses applied to an electrophoretic display. This invention is especially, but not exclusively, intended for use with particle-based electrophoretic displays in which one or more types of electrically charged particles are suspended in a liquid and are moved through the liquid under the influence of an electric field to change the appearance of the display.

In one aspect, this invention relates to apparatus which enables electro-optic media which are sensitive to the polarity of the applied field to be driven using circuitry intended for driving liquid crystal displays, in which the liquid crystal material is not sensitive to polarity.

The term "electro-optic" as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The term "gray state" is used herein in its conventional meaning in the imaging art to refer to a state intermediate two extreme optical states of a pixel, and does not necessarily imply a black-white transition between these two extreme states. For example, several of the patents and published applications referred to below describe electrophoretic displays in which the extreme states are white and deep blue, so that an intermediate "gray state" would actually be pale blue. Indeed, as already mentioned the transition between the two extreme states may not be a color change at all.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in copending application Ser. No. 10/063,236, filed Apr. 2, 2002 (Publication No. 2002/0180687; see also the corresponding International Application Publication No. WO 02/079869) that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gamma voltage" is used herein to refer to external voltage references used by drivers to determine voltages to be applied to pixels of a display. It will be appreciated that a bistable electro-optic medium does not display the type of one-to-one correlation between applied voltage and optical state characteristic of liquid crystals, the use of the term "gamma voltage" herein is not precisely the same as with conventional liquid crystal displays, in which gamma voltages determine inflection points in the voltage level/output voltage curve.

The term "impulse" is used herein in its conventional meaning of the integral of voltage with respect to time. However, some bistable electro-optic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

Several types of bistable electro-optic displays are known. One type of electro-optic display is a rotating bichromal member type as described, for example, in U.S. Pat. Nos. 5,808,783; 5,777,782; 5,760,761; 6,054,071; 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface.

Another type of electro-optic medium uses an elecrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. No. 6,301,038, International Application Publication No. WO 01/27690, and in copending applications Ser. Nos. 60/365, 368; 60/365,369; 60/365,385 and 60/365,365, all filed Mar. 18, 2002, applications Ser. Nos. 60/319,279; 60/319,280; and 60/319,281, all filed May 31, 2002; and application Ser. No. 60/319,438, filed Jul. 31, 2002.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; and 6,459,418; and U.S. Patent Applications Publication Nos. 2001/0045934; 2002/0019081; 2002/0021270; 2002/0053900; 2002/0060321; 2002/0063661; 2002/0063677; 2002/0090980; 2002/106847; 2002/0113770; 2002/0130832; 2002/0131147; and 2002/0154382, and International Applications Publication Nos. WO 99/53373; WO 99/59101; WO 99/67678; WO 00/05704; WO 00/20922; WO 00/38000; WO 00/38001; WO 00/36560; WO 00/20922; WO 00/36666; WO 00/67110; WO 00/67327; WO 01/07961; WO 01/08241; WO 01/17029; and WO 01/17041.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, WO 01/02899, at page 10, lines 6–19. See also copending application Ser. No. 09/683,903, filed Feb. 28, 2002(now U.S. Pat. No. 6,866,760), and the corresponding International Application PCT/US02/06393. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Applications Publication No. WO 02/01281, and published U.S. application No. 2002-0075556, both assigned to Sipix Imaging, Inc.

The bistable or multi-stable behavior of particle-based electrophoretic displays, and other electro-optic displays displaying similar behavior, is in marked contrast to that of conventional liquid crystal ("LC") displays. Twisted nematic liquid crystals act are not bi- or multi-stable but act as voltage transducers, so that applying a given electric field to a pixel of such a display produces a specific gray level at the pixel, regardless of the gray level previously present at the pixel. Furthermore, LC displays are only driven in one direction (from non-transmissive or "dark" to transmissive or "light"), the reverse transition from a lighter state to a darker one being effected by reducing or eliminating the electric field. Finally, the gray level of a pixel of an LC display is not sensitive to the polarity of the electric field, only to its magnitude, and indeed for technical reasons commercial LC displays usually reverse the polarity of the driving field at frequent intervals.

In contrast, bistable electro-optic displays act, to a first approximation, as impulse transducers, so that the final state of a pixel depends not only upon the electric field applied and the time for which this field is applied, but also upon the state of the pixel prior to the application of the electric field. Furthermore, it has now been found, at least in the case of many particle-based electro-optic displays, that the impulses necessary to change a given pixel through equal changes in gray level (as judged by eye or by standard optical instruments) are not necessarily constant, nor are they necessarily commutative. For example, consider a display in which each pixel can display gray levels of 0 (white), 1, 2 or 3 (black), beneficially spaced apart. (The spacing between the levels may be linear in percentage reflectance, as measured by eye or by instruments but other spacings may also be used. For example, the spacings may be linear in L*, or may be selected to provide a specific gamma; a gamma of 2.2 is often adopted for monitors, and where the present displays are be used as a replacement for a monitor, use of a similar gamma may be desirable.) It has been found that the impulse necessary to change the pixel from level 0 to level 1 (hereinafter for convenience referred to as a "0-1 transition") is often not the same as that required for a 1-2 or 2-3 transition. Furthermore, the impulse needed for a 1-0 transition is not necessarily the same as the reverse of a 0-1 transition. In addition, some systems appear to display a "memory" effect, such that the impulse needed for (say) a 0-1 transition varies somewhat depending upon whether a particular pixel undergoes 0-0-1, 1-0-1 or 3-0-1 transitions. (Where, the notation "x-y-z", where x, y, and z are all optical states 0, 1, 2, or 3 denotes a sequence of optical states visited sequentially in time.) Although these problems can be reduced or overcome by driving all pixels of the display to one of the extreme states for a substantial period before driving the required pixels to other states, the resultant "flash" of solid color is often unacceptable; for example, a reader of an electronic book may desire the text of the book to scroll down the screen, and may be distracted, or lose his place, if the display is required to flash solid black or white at frequent intervals. Furthermore, such flashing of the display increases its energy consumption and may reduce the working lifetime of the display. Finally, it has been found that, at least in some cases, the impulse required for a particular transition is affected by the temperature and the total operating time of the display, and by the time that a specific pixel has remained in a particular optical state prior to a given transition, and that compensating for these factors is desirable to secure accurate gray scale rendition.

In one aspect, this invention seeks to provide a method and a controller that can provide accurate gray levels in an electro-optic display without the need to flash solid color on the display at frequent intervals.

Furthermore, as will readily be apparent from the foregoing discussion, the drive requirements of bistable electro-optic media render unmodified drivers designed for driving active matrix liquid crystal displays (AMLCD's) unsuitable for use in bistable electro-optic media-based displays. However, such AMLCD drivers are readily available commercially, with large permissible voltage ranges and high pin-count packages, on an off-the-shelf basis, and are inexpensive, so that such AMLCD drives are attractive for drive bistable electro-optic displays, whereas similar drivers custom designed for bistable electro-optic media-based displays would be substantially more expensive, and would involve substantial design and production time. Accordingly, there are cost and development time advantages in modifying AMLCD drivers for use with bistable electro-optic displays, and this invention seeks to provide a method and modified driver which enables this to be done.

Also, as already noted, this invention relates to methods for driving electrophoretic displays which enable long-term DC-balancing of the driving impulses applied to the display. It has been found that encapsulated and other electrophoretic displays need to be driven with accurately DC-balanced waveforms (i.e., the integral of current against time for any particular pixel of the display should be held to zero over an extended period of operation of the display) to preserve image stability, maintain symmetrical switching characteristics, and provide the maximum useful working lifetime of the display. Conventional methods for maintaining precise DC-balance require precision-regulated power supplies, precision voltage-modulated drivers for gray scale, and crystal oscillators for timing, and the provision of these and similar components adds greatly to the cost of the display.

Furthermore, even with the addition of such expensive components, true DC balance is still not obtained. Empirically it has been found that many electrophoretic media have asymmetric current/voltage (I/V curves); it is believed, although the invention is in no way limited by this belief, that these asymmetric curves are due to electrochemical voltage sources within the media. These asymmetric curves mean that the current when the medium is addressed to one extreme optical state (say black) is not the same as when the medium is addressed to the opposed extreme optical state (say white), even when the voltage is carefully controlled to be precisely the same in the two cases.

It has now been found that the extent of DC imbalance in an electrophoretic medium used in a display can be ascertained by measuring the open-circuit electrochemical potential (hereinafter for convenience called the "remnant voltage" of the medium. When the remnant voltage of a pixel is zero, it has been perfectly DC balanced. If its remnant voltage is positive, it has been DC unbalanced in the positive direction. If its remnant voltage is negative, it has been DC unbalanced in the negative direction. This invention uses remnant voltage data to maintain long-term DC-balancing of the display.

SUMMARY OF INVENTION

Accordingly, in one aspect, this invention provides a method of driving a bistable electro-optic display having a plurality of pixels, each of which is capable of displaying at least three gray levels (as is conventional in the display art, the extreme black and white states are regarded as two gray levels for purposes of counting gray levels). The method comprises:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from said look-up table.

This method may hereinafter for convenience be referred to as the "look-up table method" of the present invention.

This invention also provides a device controller for use in such a method. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse.

This invention also provides a method of driving a bistable electro-optic display having a plurality of pixels, each of which is capable of displaying at least three gray levels. The method comprises:

storing a look-up table containing data representing the impulses necessary to convert an initial gray level to a final gray level;

storing data representing at least an initial state of each pixel of the display;

receiving an input signal representing a desired final state of at least one pixel of the display; and generating an output signal representing the impulse necessary to convert the initial state of said one pixel to the desired final state thereof, as determined from said look-up table, the output signal representing the period of time for which a substantially constant drive voltage is to be applied to said pixel.

This invention also provides a device controller for use in such a method. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse, the output signal representing the period of time for which a substantially constant drive voltage is to be applied to said pixel.

In another aspect, this invention provides a device controller for use in the method of the present invention. The controller comprises:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse, the output signal representing a plurality of pulses varying in at least one of voltage and duration, the output signal representing a zero voltage after the expiration of a predetermined period of time.

In another aspect, this invention provides a driver circuit having output lines arranged to be connected to drive electrodes of an electro-optic display. This driver circuit has first input means for receiving a plurality of (n+1) bit numbers representing the voltage and polarity of signals to be placed on the drive electrodes; and second input means for receiving a clock signal. Upon receipt of the clock signal, the driver circuit displays the selected voltages on its output lines. In one preferred form of this driver circuit, the selected voltages may be any one of $2^n$ discrete voltages between R and R+V, where R is a predetermined reference voltage (typically the voltage of a common front electrode in an active matrix display, as described in more detail below), and V is the maximum difference from the reference voltage which the driver circuit can assert, or any one of $2^n$ discrete voltages between R and R−V. These selected voltages may be linearly distributed over the range of R±V, or may be distributed in a non-linear manner; the non-linearity may be controlled by two or more gamma voltages placed within the specified range, each gamma voltage defining a linear regime between that gamma voltage and the adjacent gamma or reference voltage.

In another aspect, this invention provides a driver circuit having output lines arranged to be connected to drive electrodes of an electro-optic display. This driver circuit has first input means for receiving a plurality of 2-bit numbers representing the voltage and polarity of signals to be placed on the drive electrodes; and second input means for receiving a clock signal. Upon receipt of the clock signal, the driver circuit displays the voltages selected from R+V, R and R−V (where R and V are as defined above) on its output lines.

In another aspect, this invention provides a method for driving an electro-optic display which displays a remnant voltage, especially an electrophoretic display. This method comprises:

(a) applying a first driving pulse to a pixel of the display;

(b) measuring the remnant voltage of the pixel after the first driving pulse; and (c) applying a second driving pulse to the pixel following the measurement of the remnant voltage, the magnitude of the second driving pulse being controlled dependent upon the measured remnant voltage to reduce the remnant voltage of the pixel.

This method may hereinafter for convenience be referred to as the "remnant voltage" method of the present invention.

DETAILED DESCRIPTION

Figure 1:
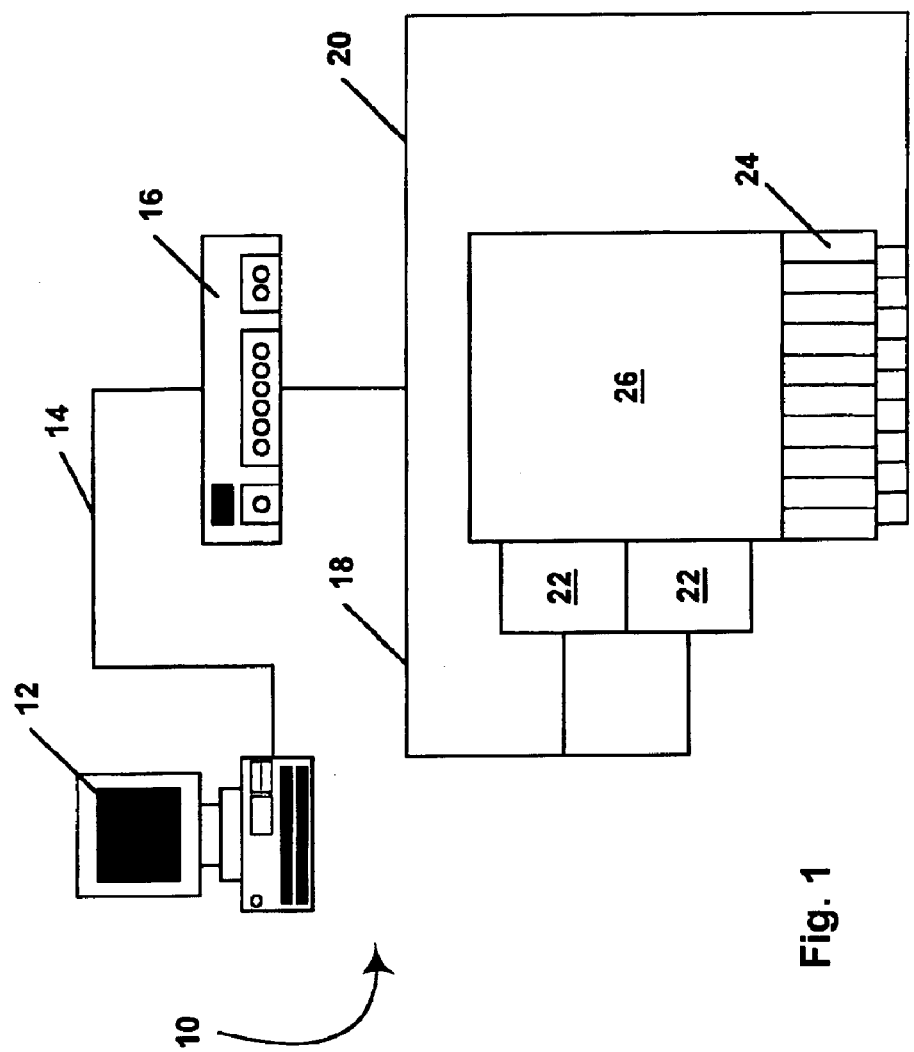
FIG. 1 is a schematic representation of an apparatus of the present invention, a display which is being driven by the apparatus, and associated apparatus, and is designed to show the overall architecture of the system.

As already mentioned, the look-up table aspect of the present invention provides methods and controllers for driving electro-optic displays having a plurality of pixels, each of which is capable of displaying at least three gray levels. The present invention may of course be applied to electro-optic displays having a greater number of gray levels, for example 4, 8, 16 or more.

Also as already mentioned, driving bistable electro-optic displays requires very different methods from those normally used to drive liquid crystal displays ("LCD's"). In a conventional (non-cholesteric) LCD, applying a specific voltage to a pixel for a sufficient period will cause the pixel to attain a specific gray level. Furthermore, the LC material is only sensitive to the magnitude of the electric field, not its polarity. In contrast, bistable electro-optic displays act as impulse transducers, so there is no one-to-one mapping between applied voltage and gray state attained; the impulse (and thus the voltage) which must be applied to a pixel to achieve a given gray state varies with the "initial" gray state of the relevant pixel. Furthermore, since bistable electro-optic displays need to be driven in both directions (white to black, and black to white) it is necessary to specify both the polarity and the magnitude of the impulse needed.

At this point, it is considered desirable to define certain terms which are used herein in accordance with their conventional meaning in the display art. Most of the discussion below will concentrate upon one or more pixels of a display undergoing a single gray scale transition (i.e., a change from one gray level to another) from an "initial" state to a "final" state. Obviously, the initial state and the final state are so designated only with regard to the single transition being considered and in most cases the pixel with have undergone transitions prior to the "initial" state and will undergo further transitions after the "final" state. As explained below, some embodiments of the invention take account not only of the initial and final states of the pixel but also of "prior" states, in which the pixel existed prior to achieving the initial state. Where it is necessary to distinguish between multiple prior states, the term "first prior state" will be used to refer to the state in which the relevant pixel existed one (non-zero) transition prior to the initial state, the term "second prior state" will be used to refer to the state in which the relevant pixel existed one (non-zero) transition prior to the first prior state, and so on. The term "non-zero transition" is used to refer to a transition which effects a change of at least one unit in gray scale; the term "zero transition" may be used to refer to a "transition" which effects no change in gray scale of the selected pixel (although other pixels of the display may be undergoing non-zero transitions at the same time).

As will readily be apparent to those skilled in image processing, a simple embodiment of the method of the present invention may takes account of only of the initial state of each pixel and the final state, and in such a case the look-up table will be two-dimensional. However, as already mentioned, some electro-optic media display a memory effect and with such media it is desirable, when generating the output signal, to take into account not only the initial state of each pixel but also (at least) the first prior state of the same pixel, in which case the look-up table will be three-dimensional. In some cases, it may be desirable to take into account more than one prior state of each pixel, thus resulting in a look-up table having four (if only the first and second prior states are taken into account) or more dimensions.

From a formal mathematical point of view, the present invention may be regarded as comprising an algorithm that, given information about the initial, final and (optionally) prior states of an electro-optic pixel, as well as (optionally— see more detailed discussion below) information about the physical state of the display (e.g., temperature and total operating time), will produce a function V(t) which can be applied to the pixel to effect a transition to the desired final state. From this formal point of view, the controller of the present invention may be regarded as essentially a physical embodiment of this algorithm, the controller serving as an interface between a device wishing to display information and an electro-optic display.

Ignoring the physical state information for the moment, the algorithm is, in accordance with the present invention, encoded in the form of a look-up table or transition matrix. This matrix will have one dimension each for the desired final state, and for each of the other states (initial and any prior states) are used in the calculation. The elements of the matrix will contain a function V(t) that is to be applied to the electro-optic medium.

The elements of the look-up table or transition matrix may have a variety of forms. In some cases, each element may comprise a single number. For example, an electro-optic display may use a high precision voltage modulated driver circuit capable of outputting numerous different voltages both above and below a reference voltage, and simply apply the required voltage to a pixel for a standard, predetermined period. In such a case, each entry in the look-up table could simply have the form of a signed integer specifying which voltage is to be applied to a given pixel. In other cases, each element may comprise a series of numbers relating to different portions of a waveform. For example, there are described below embodiments of the invention which use single- or double-prepulse waveforms, and specifying such a waveform necessarily requires several numbers relating to different portions of the waveform. Also described below is an embodiment of the invention which in effect applies pulse length modulation by applying a predetermined voltage to a pixel during selected ones of a plurality of sub-scan periods during a complete scan. In such an embodiment, the elements of the transition matrix may have the form of a series of bits specifying whether or not the predetermined voltage is to be applied during each sub-scan period of the relevant transition. Finally, as discussed in more detail below, in some cases, such as a temperature-compensated display, it may be convenient for the elements of the look-up table to be in the form of functions (or, in practice, more accurately coefficients of various terms in such functions).

It will be apparent that the look-up tables used in some embodiments of the invention may become very large. To take an extreme example, consider a process of the invention for a 256 ($2^8$) gray level display using an algorithm that takes account of initial, final and two prior states. The necessary four-dimensional look-up table has $2^{32}$ entries. If each entry requires (say) 64 bits (8 bytes), the total size of the look-up table would be approximately 32 Gbyte. While storing this amount of data poses no problems on a desktop computer, it may present problems in a portable device. However, in practice the size of such large look-up tables can be substantially reduced. In many instances, it has been found that there are only a small number of types of waveforms needed for a large number of different transitions, with, for example, the length of individual pulses of a general waveform being varied between different transitions. Consequently, the length of individual entries in the look-up table can be reduced by making each entry comprises (a) a pointer to an entry in a second table specifying one of a small number of types of waveform to be used; and (b) a small number of parameters specifying how this general waveform should be varied for the relevant transition.

The values for the entries in the look-up table may be determined in advance through an empirical optimization process. Essentially, one sets a pixel to the relevant initial state, applies an impulse estimated to approximately equal that needed to achieve the desired final state and measures the final state of the pixel to determine the deviation, if any, between the actual and desired final state. The process is then repeated with a modified impulse until the deviation is less than a predetermined value, which may be determined by the capability of the instrument used to measure the final state. In the case of methods which take into account one or more prior states of the pixel, in addition to the initial state, it will generally be convenient to first determine the impulse needed for a particular transition when the state of the pixel is constant in the initial state and all preceding states used in determining the impulse, and then to "fine tune" this impulse to allow for differing previous states.

The present method desirably provides for modification of the impulse to allow for variation in temperature and/or total operating time of the display; compensation for operating time may be required because some electro-optic media "age" and their behavior changes after extended operation. Such modification may be done in one of two ways. Firstly, the look-up table may be expanded by an additional dimension for each variable that is to be taken into account in calculating the output signal. Obviously, when dealing with continuous variables such as temperature and operating, it is necessary to quantize the continuous variable in order to maintain the look-up table at a practicable finite size. In order to find the waveform to be applied to the pixel, the calculation means may simply choose the look-up table entry for the table closest to the measured temperature. Alternatively, to provide more accurate temperature compensation, the calculation means may look up the two adjacent look-up table entries on either side of the measured continuous variable, and apply an appropriate interpolation algorithm to get the required entry at the measured intermediate value of the variable. For example, assume that the matrix includes entries for temperature in increments of 10° C. If the actual temperature of the display is 25° C., the calculation would look up the entries for 20° and 30° C., and use a value intermediate the two. Note that since the variation of characteristics of electro-optic media with temperature is often not linear, the set of temperatures for which the look-up table stores entries may not be distributed linearly; for example, the variation of many electro-optic media with temperature is most rapid at high temperatures, so that at low temperatures intervals of 20° C. between look-up tables, might suffice, whereas at high temperatures intervals of 5° C. might be desirable.

An alternative method for temperature/operating time compensation is to use look-up table entries in the form of functions of the physical variable(s), or perhaps more accurately coefficients of standard terms in such functions. For simplicity consider the case of a display which uses a time modulation drive scheme in which each transition is handled by applying a constant voltage (of either polarity) to each pixel for a variable length of time, so that, absent any correction for environmental variables, each entry in the look-up table could consist only of a single signed number representing the duration of time for which the constant voltage is to be applied, and its polarity. If it is desired to correct such a display for variations in temperature such that the time $T_t$ for which the constant voltage needs to be applied for a specific transition at a temperature t is given by:

$$T_t = T_0 + A\Delta t + B(\Delta t)^2$$

where $T_0$ is the time required at some standard temperature, typically the mid-point of the intended operating temperature range of the display, and $\Delta t$ is the difference between t and the temperature at which $T_0$ is measured, the entries in the look-up table can consist of the values of $T_0$, A and B for the specific transition to which a given entry relates, and the calculation means can use these coefficients to calculate $T_t$ at the measured temperature. To put it more generally, the calculation means finds the appropriate look-up table entry for the relevant initial and final states, then uses the function defined by that entry to calculate the proper output signal having regard to the other variables to be taken into account.

The relevant temperature to be used for temperature compensation calculations is that of the electro-optic material at the relevant pixel, and this temperature may differ significantly from ambient temperature, especially in the case of displays intended for outdoor use where, for example, sunlight acting through a protective front sheet may cause the temperature of the electro-optic layer to be substantially higher than ambient. Indeed, in the case of large billboard-type outdoor signs, the temperature may vary between different pixels of the same display if, for example, part of the display falls within the shadow of an adjacent building, while the reminder is in full sunlight. Accordingly, it may be desirable to embed one or more thermocouples or other temperature sensors within or adjacent to the electro-optic layer to determine the actual temperature of this layer. In the case of large displays, it may also be desirable to provide for interpolation between temperatures sensed by a plurality of temperature sensors to estimate the temperature of each particular pixel. Finally, in the case of large displays formed from a plurality of modules which can replaced individually, the method and controller of the invention may provide for different operating times for pixels in different modules.

The method and controller of the present invention may also allow for the residence time (i.e., the period since the pixel last underwent a non-zero transition) of the specific pixel being driven. It has been found that, at least in some cases, the impulse necessary for a given transition various with the residence time of a pixel in its optical state. Thus, it may be desirable or necessary to vary the impulse applied for a given transition as a function of the residence time of the pixel in its initial optical state. In order to accomplish this, the look-up table may optionally contain an additional dimension, which is indexed by a counter indicating the residence time of the pixel in its initial optical state. In addition, the controller will require an additional storage area that contains a counter for every pixel in the display. It will also require a display clock, which increments by one the counter value stored in each pixel at a set interval. The length of this interval must be an integral multiple of the frame time of the display, and therefore must be no less than one frame time. The size of this counter and the clock frequency will be determined by the length of time over which the applied impulse will be varied, and the necessary time resolution. For example, storing a 4-bit counter for each pixel would allow the impulse to vary at 0.25 second intervals over a 4-second period (4 seconds*4 counts/sec=16 counts=4 bits). The counter may optionally be reset upon the occurrence of certain events, such as the transition of the pixel to a new state. Upon reaching its maximum value, the counter may be configured to either "roll over" to a count of zero, or to maintain its maximum value until it is reset.

The look-up table method of the present invention may of course be modified to take account of any other physical parameter which has a detectable effect upon the impulse needed to effect any one or more specific transitions of an electro-optic medium. For example, the method could be modified to incorporate corrections for ambient humidity if the electro-optic medium is found to be sensitive to humidity.

For a bistable electro-optic medium, the look-up table will have the characteristic that, for any zero transition in which the initial and final states of the pixel are the same, the entry will be zero, or in other words, no voltage will be applied to the pixel. As a corollary, if no pixels on the display change during a given interval, then no impulses must be applied. This enables ultra-low power operation, as well as ensuring that the electro-optic medium is not overdriven while a static image is being displayed. In general, the look-up table should only retain information about non-null transitions. In other words, for two images, I and I+1, if a given pixel is in the same state in I and I+1, then state I+1 would not be stored in the prior state table, and that no further information will be stored until that pixel undergoes a transition.

As will readily be apparent to those skilled in modern electronic technology, the controller of the present invention can have a variety of physical forms, and may use any conventional data processing components. For example, the present method could be practiced using a general purpose digital computer in conjunction with appropriate equipment (for example, one or more digital analog converters, "DAC's") to convert the digital outputs from the computer to appropriate voltages for application to pixels. Alternatively, the present method could be practiced using an application specific integrated circuit (ASIC). In particular, the controller of the present invention could have the form of a video card which could be inserted into a personal computer to enable the images generated by the computer to be displayed on an electro-optic screen instead of or in addition to an existing screen, such as a LCD. Since the construction of the controller of the present invention is well within the level of skill in the image processing art, it is unnecessary to describe its circuitry in detail herein.

A preferred physical embodiment of the controller of the present invention is a timing controller integrated circuit (IC). This IC accepts incoming image data and outputs control signals to a collection of data and select driver IC's, in order to produce the proper voltages at the pixels to produce the desired image. This IC may accept the image data through access to a memory buffer that contains the image data, or it may receive a signal intended to drive a traditional LCD panel, from which it can extract the image data. It may also receive any serial signal containing information that it requires to perform the necessary impulse calculations. Alternately, this timing controller can be implemented in software, or incorporated as a part of the CPU. The timing controller may also have the ability to measure any external parameters that influence the operation of the display, such as temperature.

The controller can operate as follows. The look-up table (s) are stored in memory accessible to the controller. For each pixel in turn, all of the necessary initial, final and (optionally) prior and physical state information is supplied as inputs. The state information is then used to compute an index into the look-up table. In the case of quantized temperature or other correction, the return value from this look-up will be one voltage, or an array of voltages versus time. The controller will repeat this process for the two bracketing temperatures in the look-up table, then interpolate between the values. For the algorithmic temperature correction, the return value of the look-up will be one or more parameters, which can then be inserted into an equation along with the temperature, to determine the proper form of the drive impulse, as already described. This procedure can be accomplished similarly for any other system variables that require real-time modification of the drive impulse. One or more of these system variables may be determined by, for example, the value of a programmable resistor, or a memory location in an EPROM, which is set on the display panel at the time of construction in order to optimize the performance of the display.

An important feature of the display controller is that, unlike most displays, in most practical cases several complete scans of the display will be required in order to complete an image update. The series of scans required for one image update should be considered to be an uninterruptible unit. If the display controller and image source are operating asynchronously, then the controller must ensure that the data being used to calculate applied impulses remains constant across all scans. This can be accomplished in one of two ways. Firstly, the incoming image data could be stored in a separate buffer by the display controller (alternatively, if the display controller is accessing a display buffer through dual-ported memory, it could lock out access from the CPU). Secondly, on the first scan, the controller may store the calculated impulses in an impulse buffer. The second option has the advantage that the overhead for scanning the panel is only incurred once per transition, and the data for the remaining scans can be output directly from the buffer.

Optionally, imaging updating may be conducted in an asynchronous manner. Although it will, in general, take several scans to effect a complete transition between two images, individual pixels can begin transitions, or reverse transitions that have already started, in mid-frame. In order to accomplish this, the controller must keep track of what portion of the total transition have been accomplished for a given pixel. If a request is received to change the optical state of a pixel that is not currently in transition, then the counter for that pixel can be set to zero, and the pixel will begin transitioning on the next frame. If the pixel is actively transitioning when a new request is received, then the controller will apply an algorithm to determine how to reach the new state from the current mid-transition state. For 1-bit general image flow, one potential algorithm is simply to apply a pulse of reverse polarity, with amplitude and duration equal to the portion of the forward pulse that has already been applied.

In order to minimize the power necessary to operate a display, and to maximize the image stability of the electro-optic medium, the display controller may stop scanning the display and reduce the voltage applied to all pixels to, or close to, zero, when there are no pixels in the display that are undergoing transitions. Very advantageously, the display controller may turn off the power to its associated row and column drivers while the display is in such a "hold" state, thus minimizing power consumption. In this scheme, the drivers would be reactivated when the next pixel transition is requested.

FIG. 1 of the accompanying drawings shows schematically an apparatus of the invention in use, together with associated apparatus. The overall apparatus (generally designated 10) shown in FIG. 1 comprises an image source, shown as a personal computer 12 which outputs on a data line 14 data representing an image. The data line 14 can be of any conventional type and may be a single data line or a bus; for example, the data line 14 could comprise a universal serial bus (USB), serial, parallel, IEEE-1394 or other line. The data which are placed on the line 14 can be in the form of a conventional bit mapped image, for example a bit map (BMP), tagged image file format (TIF), graphics interchange format (GIF) or Jooint Photographic Experts Group (JPEG) file. Alternatively, however, the data placed on the line 14 could be in the form of signals intended for driving a video device; for example, many computers provide a video output for driving an external monitor and signals on such outputs may be used in the present invention. It will be apparent to those skilled in imaging processing that the apparatus of the present invention described below may have to perform substantial file format conversion and/or decoding to make use of the disparate types of input signals which can be used, but such conversion and/or decoding is well within the level of skill in the art, and accordingly, the apparatus of the present invention will be described only from the point at which the image data used as its original inputs have been converted to a format in which they can be processed by the apparatus.

The data line 14 extends to a controller unit 16 of the present invention, as described in detail below. This controller unit 16 generates one set of output signals on a data bus 18 and a second set of signals on a separate data bus 20. The data bus 18 is connected to two row (or gate) drivers 22, while the data bus 20 is connected to a plurality of column (or source) drivers 24. (The number of column drivers 24 is greatly reduced in FIG. 1 for ease of illustration.) The row and column drivers control the operation of a bistable electro-optic display 26.

The apparatus shown in FIG. 1 is chosen to illustrate the various units used, and is most suitable for a developmental, "breadboard" unit. In actual commercial production, the controller 16 will typically be part of the same physical unit as the display 26, and the image source may also be part of this physical unit, as in conventional laptop computers equipped with LCD's, and in personal digital assistants. Also, the present invention is illustrated in FIG. 1 and will be mainly described below, in conjunction with an active matrix display architecture which has a single common, transparent electrode (not shown in FIG. 1) on one side of the electro-optic layer, this common electrode extending across all the pixels of the, display. Typically, this common electrode lies between the electro-optic layer and the observer and forms a viewing surface through which an observer views the display. On the opposed side of the electro-optic layer is disposed a matrix of pixel electrodes arranged in rows and columns such that each pixel electrode is uniquely defined by the intersection of a single row and a single column. Thus, the electric field experienced by each pixel of the electro-optic layer is controlled by varying the voltage applied to the associated pixel electrode relative to the voltage (normally designated "Vcom") applied to the common front electrode. Each pixel electrode is associated with at least one transistor, typically a thin film transistor. The gates of the transistors in each row are connected via a single elongate row electrode to one of the row drivers 22. The source electrodes of the transistors in each column are connected via a single elongate column electrode to one of column drivers 24. The drain electrode of each transistor is connected directly to the pixel electrode. It will be appreciated that the assignment of the gates to rows and the source electrodes to columns is arbitrary, and could be reversed, as could the assignment of source and drain electrodes. However, the following description will assume the conventional assignments.

During operation, the row drivers 22 apply voltages to the gates such that the transistors in one and only one row are conductive at any given time. Simultaneously, the column drivers 24 apply predetermined voltages to each of the column electrodes. Thus, the voltages applied to the column drivers are applied to only one row of the pixel electrodes, thus writing (or at least partially writing) one line of the desired image on the electro-optic medium. The row driver then shifts to make the transistors in the next row conductive, a different set of voltages are applied to the column electrodes, and the next line of the image is written.

It is emphasized that the present invention is not confined to such active matrix displays. Once the correct waveforms for each pixel of the image have been determined in accordance with the present invention, any switching scheme may be used to apply the waveforms to the pixels. For example, the present invention can use a so-called "direct drive" scheme, in which each pixel is provided with a separate drive line. In principle, the present invention can also use a passive matrix drive scheme of the type used in some LCD's, but it should be noted that, since many bistable electro-optic media lack a threshold for switching (i.e., the media will change optical state if even a small electric field is applied for a prolonged period), such media are unsuitable for passive matrix driving. However, since it appears that the present invention will find its major application in active matrix displays, it will be described herein primarily with reference to such displays.

The controller unit 16 (FIG. 1) has two main functions. Firstly, using the method of the present invention, the controller calculates a two-dimensional matrix of impulses (or waveforms) which must be applied to the pixels of a display to change an initial image to a final image. Secondly, the controller 16 calculates, from this matrix of impulses, all the timing signals necessary to provide the desired impulses at the pixel electrodes using the conventional drivers designed for use with LCD's to drive a bistable electro-optic display.

Figure 2:
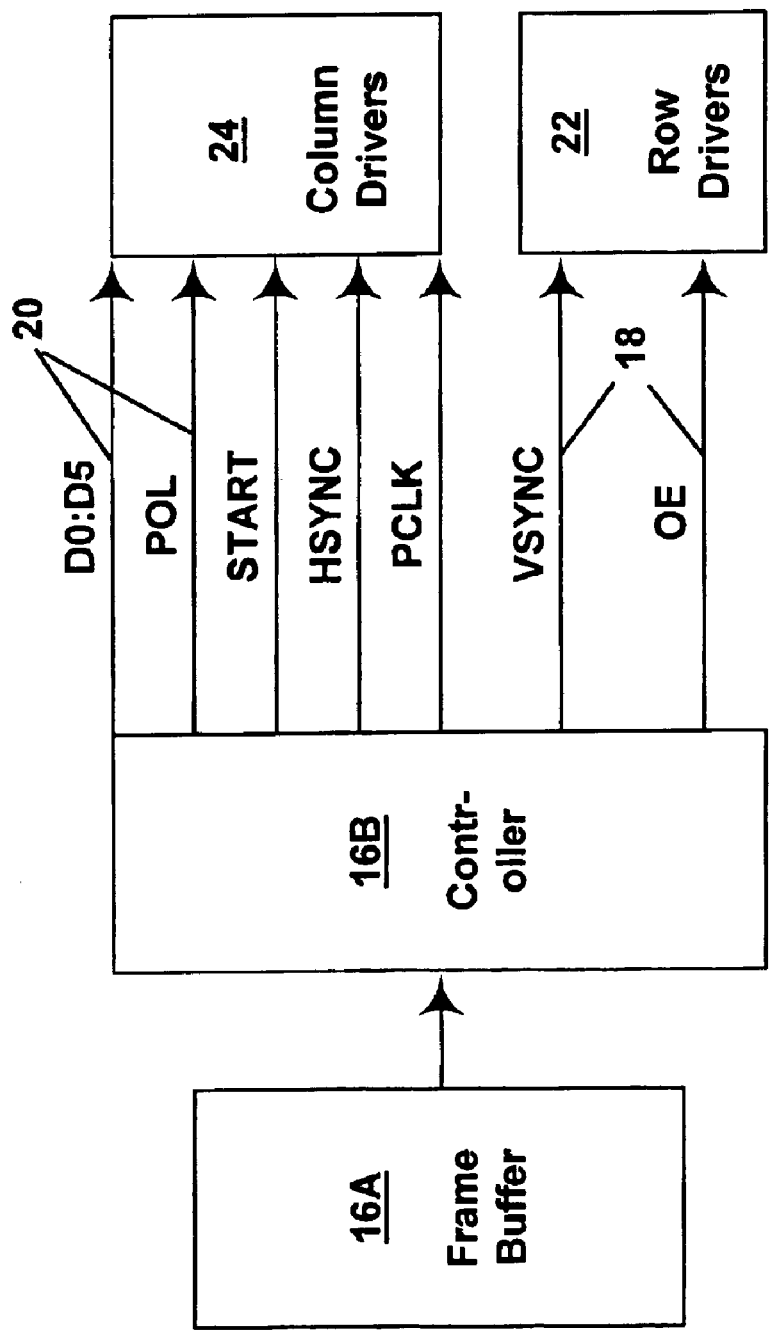
FIG. 2 is a schematic block diagram of the controller unit shown in FIG. 1 and illustrates the output signals generated by this unit.

As shown in FIG. 2, the controller unit 16 shown in FIG. 1 has two main sections, namely a frame buffer 16A, which buffers the data representing the final image which the controller 16B is to write to the display 26 (FIG. 1), and the controller proper, denoted 16B. The controller 16B reads data from the buffer 16A pixel by pixel and generates various signals on the data buses 18 and 20 as described below.

The signals shown in FIG. 2 are as follows:

D0:D5—a six-bit voltage value for a pixel (obviously, the number of bits in this signal may vary depending upon the specific row and column drivers used)

POL—pixel polarity with respect to Vcom (see below)

START—places a start bit into the column driver 24 to enable loading of pixel values HSYNC—horizontal synchronization signal, which latches the column driver PCLK—pixel clock, which shifts the start bit along the row driver VSYNC—vertical synchronization signal, which loads a start bit into the row driver OE—output enable signal, which latches the row driver.

Of these signals, VSYNC and OE supplied to the row drivers 22 are essentially the same as the corresponding signals supplied to the row drivers in a conventional active matrix LCD, since the manner of scanning the rows in the apparatus shown in FIG. 1 is in principle identical to the manner of scanning an LCD, although of course the exact timing of these signals may vary depending upon the precise electro-optic medium used. Similarly, the START, HSYNC and PCLK signals supplied to the column drivers are essentially the same as the corresponding signals supplied to the column drivers in a conventional active matrix LCD, although their exact timing may vary depending upon the precise electro-optic medium used. Hence, it is considered that no further description of these output signals in necessary.

Figure 3:
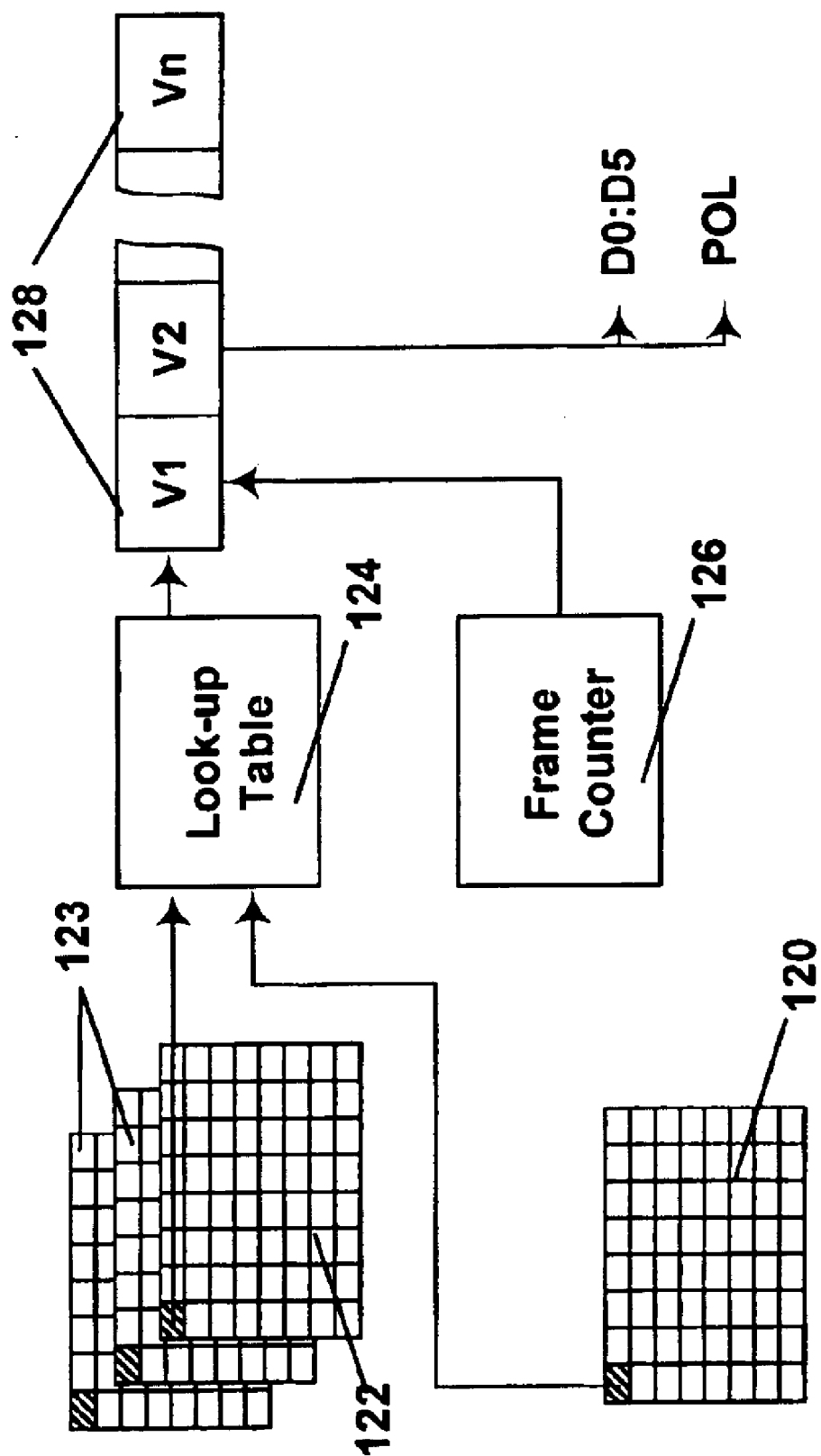
FIG. 3 is a schematic block diagram showing the manner in which the controller unit shown in FIGS. 1 and 2 generates certain output signals shown in FIG. 2.

FIG. 3 illustrates, in a highly schematic manner, the way in which the controller 16B shown in FIG. 2 generates the D0:D5 and POL signals. As described above, the controller 16B stores data representing the final image 120 (the image which it is desired to write to the display), the initial image 122 previously written to the display, and optionally one or more prior images 123 which were written to the display before the initial image. The embodiment of the invention shown in FIG. 3 stores two such prior images 123. (Obviously, the necessary data storage can be within the controller 16B or in an external data storage device.) The controller 16B uses the data for a specific pixel (illustrated as the first pixel in the first row, as shown by the shading in FIG. 3) in the initial, final and prior images 120, 122 and 123 as pointers into a look-up table 124, which provides the value of the impulse which must be applied to the specific pixel to change the state of that pixel to the desired gray level in the final image. The resultant output from the look-up table 124, and the output from a frame counter 126, are supplied to a voltage v. frame array 128, which generates the D0:D5 and POL signals.

The controller 16B is designed for use with a TFT LCD driver that is equipped with pixel inversion circuitry, which ordinarily alternates the polarity of neighboring pixels with respect to the top plane. Alternate pixels will be designated as even and odd, and are connected to opposing sides of the voltage ladder. Furthermore, a driver input, labeled "polarity", serves to switch the polarity of the even and odd pixels. The driver is provided with four or more gamma voltage levels, which can be set to determine the local slope of the voltage-level curve. A representative example of a commercial integrated circuit (IC) with these features is the Samsung KS0652 300/309 channel TFT-LCD source driver. As previously discussed, the display to be driven uses a common electrode on one side of the electro-optic medium, the voltage applied to this common electrode being referred to as the "top plane voltage" or "Vcom".

Figure 4:
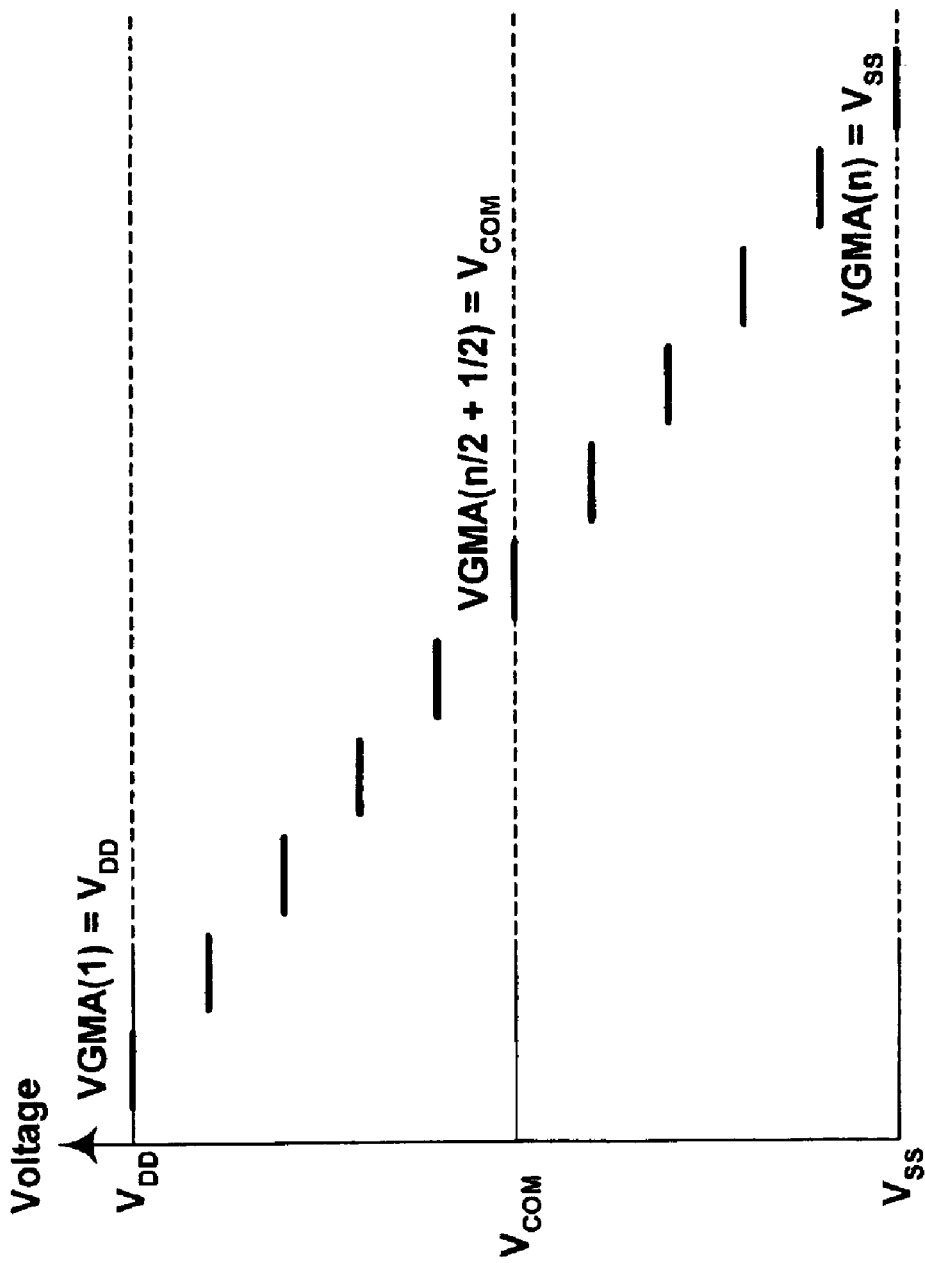
FIGS. 4 and 5 illustrate two different sets of reference voltages which can be used in the display shown in FIG. 1.
Figure 5:
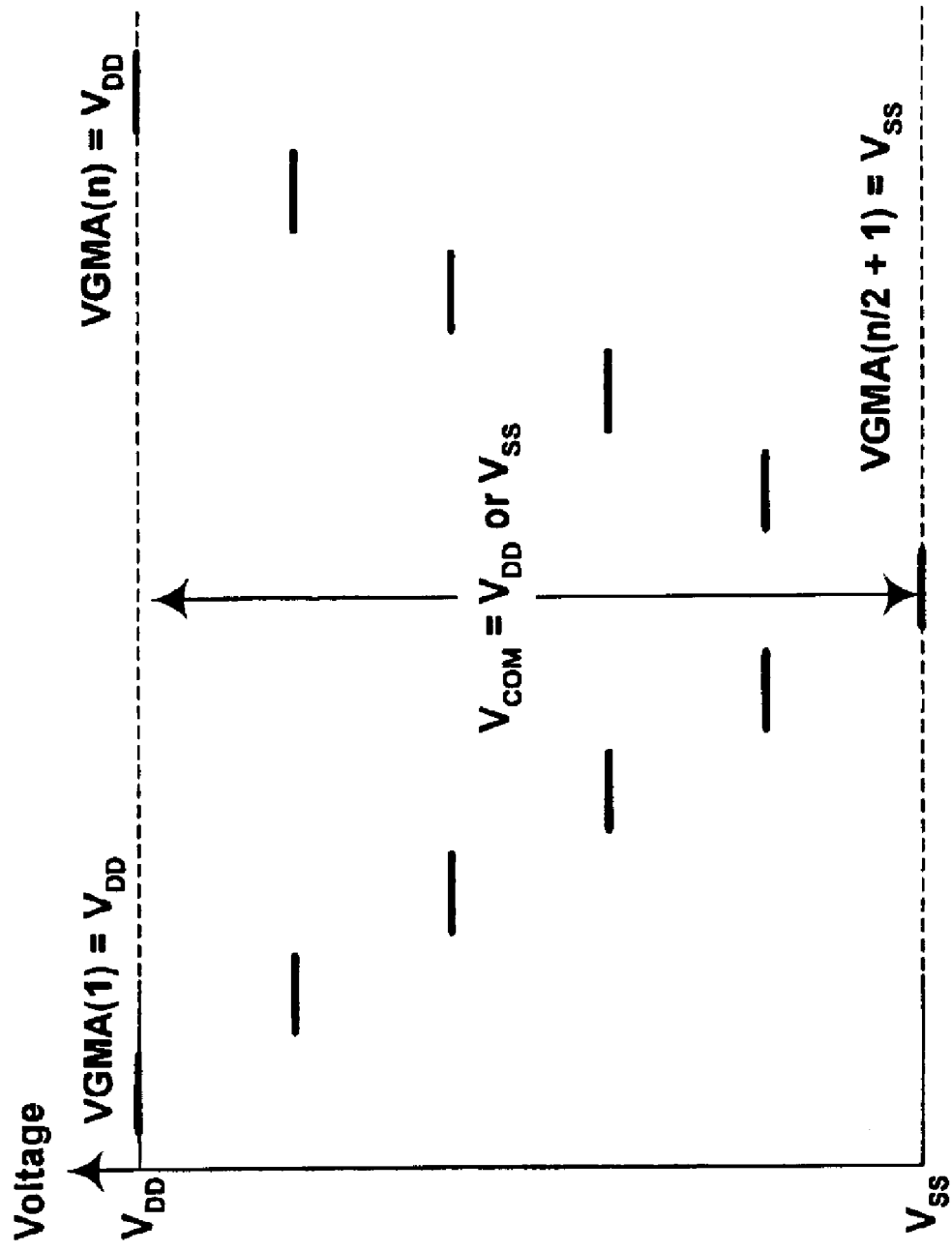

In one embodiment, illustrated in FIG. 4 of the accompanying drawings, the reference voltages of the driver are arranged so that the top plane voltage is placed at one half the maximum voltage (Vmax) which the driver can supply, i.e.

$$Vcom=Vmax/2$$

and the gamma voltages are arranged to vary linearly above and below the top plane voltage. (FIGS. 4 and 5 are drawn assuming an odd number of gamma voltages so that, for example, in FIG. 4 the gamma voltage VGMA(n/2+½) is equal to Vcom. If an even number of gamma voltages are present, both VGMA(n/2) and VGMA(n/2+1) are set equal to $V_{com}$. Similarly, in FIG. 5, if an even number of gamma voltages are present, both VGMA(n/2) and VGMA(n/2+1) are set equal to the ground voltage Vss.) The pulse length necessary to achieve all needed transitions is determined by dividing the largest impulse needed to create the new image by Vmax/2. This impulse can be converted into a number of frames by multiplying by the scan rate of the display. The necessary number of frames is then multiplied by two, to give an equal number of even and odd frames. These even and odd frames will correspond to whether the polarity bit is set high or low for the frame. For each pixel in each frame, the controller 16B must apply an algorithm which takes as its inputs (1) whether the pixel is even or odd; (2) whether the polarity bit is high or low for the frame being considered; (3) whether the desired impulse is positive or negative; and (4) the magnitude of the desired impulse. The algorithm then determines whether the pixel can be addressed with the desired polarity during that frame. If so, the proper drive voltage (impulse/pulse length) is applied to the pixel. If not, then the pixel is brought to the top plane voltage (Vmax/2) to place it in a hold state, in which no electric field is applied to the pixel during that frame.

For example, consider two neighboring pixels in the display, an odd pixel 1 and an even pixel 2. Further, assume that when the polarity bit is high, the odd pixels will be able to access the positive drive voltage range (i.e. above the top plane voltage), and the even pixels will be able to access the negative voltages (i.e. below the top plane voltage). If both pixels 1 and 2 need to be driven with a positive impulse, then the following sequence must occur:

(a) during the positive polarity frames, pixel 1 is driven with a positive voltage, and pixel 2 is held at the top plane voltage; and (b) during the negative polarity frames, pixel 1 is held at the top plane voltage, while pixel 2 is driven with a positive voltage.

Although typically frames with positive and negative polarity will be interleaved 1:1 (i.e., will alternate with each other), but this is not necessary; for example, all the odd frames could be grouped together, followed by all the even frames. This would result in alternate columns of the display being driven in two separate groups.

The major advantage of this embodiment is that the common front electrode does not have to be switched during operation. The primary disadvantage is that the maximum drive voltage available to the electro-optic medium is only half of the maximum voltage of the driver, and that each line may only be driven 50% of the time. Thus, the refresh time of such a display is four times the switching time of the electro-optic medium under the same maximum drive voltage.

In a second embodiment of this form of the invention, the gamma voltages of the driver are arranged as shown in FIG. 5, and the common electrode switches between V=0 and V=Vmax. Arranging the gamma voltages in this way allows both even and odd pixels to be driven simultaneously in a single direction, but requires that the common electrode be switched to access the opposite drive polarity. In addition, because this arrangement is symmetric about the top plane voltage, a particular input to the drivers will result in the same voltage being applied on either an odd or an even pixel. In this case, the inputs to the algorithm are the magnitude and sign of the desired impulse, and the polarity of the top plane. If the current common electrode setting corresponds to the sign of the desired impulse, then this value is output. If the desired impulse is in the opposite direction, then the pixel is set to the top plane voltage so that no electric field is applied to the pixel during that frame.

As in the embodiment previously described, in this embodiment the necessary length of the drive pulse can be calculated by dividing the maximum impulse by the maximum drive voltage, and this value converted into frames by multiplying by the display refresh rate. Again, the number of frames must be doubled, to account for the fact that the display can only be driven in one direction with respect to the top plane at a time.

The major advantage of this second embodiment is that the full voltage of the driver can be used, and all of the outputs can be driven at once. However, two frames are required for driving in opposed directions. Thus, the refresh time of such a display is twice the switching time of the electro-optic medium under the same maximum drive voltage. The major drawback is the need to switch the common electrode, which may result in unwanted voltage artifacts in the electro-optic medium, the transistors associated with the pixel electrodes, or both.

In either embodiment, the gamma voltages are normally arranged on a linear ramp between the maximum voltages of the driver and the top plane voltage. Depending upon the design of the driver, it may be necessary to set one or more of the gamma voltages at the top plane value, in order to ensure that the driver can actually produce the top plane voltage on the output.

Reference has already been made above to the need to adapt the method of the present invention to the limitations of conventional drivers designed for use with LCD's. More specifically, conventional column drivers for LCD's, and particularly super twisted nematic (STN) LCD's (which can usually handle higher voltages than other types of column drivers), are only capable of applying one of two voltages to a drive line at any given time, since this is all that a polarity-insensitive LC material requires. In contrast, to drive polarity-sensitive electro-optic displays, a minimum of three driver voltage levels are necessary. The three driver voltages required are V−, which drives a pixel negative with respect to the top plane voltage, V+, which drives a pixel positive with respect to the top plane voltage, and 0V with respect to the top plane voltage, which will hold the pixel in the same display state.

The method of the present invention can, however, be practiced with this type of conventional LCD driver, provided that the controller is arranged to apply an appropriate sequence of voltages to the inputs of one or more column drivers, and their associated row drivers, in order to apply the necessary impulses to the pixels of an electro-optic display.

There are two principal variants of this approach. In the first variant, all the impulses applied must have one of three values: +I, −I or 0, where:

$$+I=-(-I)=Vapp*t_{pulse}$$

where Vapp is the applied voltage above the top plane voltage, and $t_{pulse}$ is the pulse length in seconds. This variant only allows the display to operate in a binary (black/white) mode. In the second variant, the applied impulses may vary from +I to −I, but must be integral multiples of Vapp/freq, where freq is the refresh frequency of the display.

This aspect of the present invention takes advantage of the fact that, as already noted, conventional LCD drivers are designed to reverse polarity at frequent intervals to avoid certain undesirable effects which might otherwise be produced in the display. Consequently, such drivers are arranged to receive from the controller a polarity or control voltage, which can either be high or low. When a low control voltage is asserted, the output voltage on any given driver output line can adopt one of two out of the possible three voltages required, say V1 or V2, while when a high control voltage is asserted, the output voltage on any given line can adopt one of a different two of the possible three voltages required, say V2 or V3. Thus, while only two out of the three required voltages can be addressed at any specific time, all three voltages can be achieved at differing times. The three required voltages will usually satisfy the relationship:

$$V2=(V3+V1)/2$$

and V1 may be at or near the logic ground.

In this method of the invention, the display will be scanned 2*$t_{pulse}$*freq times. For half these scans (i.e., for $t_{pulse}$*freq scans), the driver will be set to output either V1 or V2, which will normally be equal to −V and Vcom, respectively. Thus, during these scans, the pixels are either driven negative, or held in the same display state. For the other half of the scans, the driver will be switched to output either V2 or V3, which will normally be at Vcom and +V respectively. In these scans, the pixels are driven positive or held in the same display state. Table 1 below illustrates how these options can be combined to produce a drive in either direction or a hold state; the correlation of positive driving with approach to a dark state and negative driving with approach to a light state is of course a function of the specific electro-optic medium used.

TABLE 1

Drive sequence for achieving bi-directional drive plus hold with STN drivers

| | Driver outputs | |
|---|---|---|
| Desired Drive | V1–V2 | V2–V3 |
| positive (drive dark) | V2 | V3 |
| negative (drive white) | V1 | V2 |
| hold | V2 | V2 |

There are several different ways to arrange the two portions of the drive scheme (i.e., the two different types of scans or "frames"). For example, the two types of frames could alternate. If this is done at a high refresh rate, then the electro-optic medium will appear to be simultaneously lightening and darkening, when in fact it is being driven in opposed direction in alternate frames. Alternatively, all of the frames of one type could occur before any of the frames of the second type; this would result in a two-step drive appearance. Other arrangements are of course possible; for example two or more frames of one type followed by two or more of the opposed type. Additionally, if there are no pixels that need to be driven in one of the two directions, then the frames of that polarity can be dropped, reducing the drive time by 50%.

While this first variant can only produce binary images, the second variant can render images with multiple gray scale levels. This is accomplished by combining the drive scheme described above with modulation of the pulse widths for different pixels. In this case, the display is again scanned 2*$t_{pulse}$*freq times, but the driving voltage is only applied to any particular pixel during enough of these scans to ensure that the desired impulse for that particular pixel is achieved. For example, for each pixel, the total applied impulse could be recorded, and when the pixel reached its desired impulse, the pixel could be held at the top plane voltage for all subsequent scans. For pixels that need to be driven for less than the total scanning time, the driving portion of this time (i.e., the portion of the time during which an impulse is applied to change the display state of the pixel, as opposed to the holding portion during which the applied voltage simply maintains the display state of the pixel) may be distributed in a variety of ways within the total time. For example, all driving portions could be set to start at the beginning of the total time, or all driving portions could instead be timed to complete at the end of the total time. As in the first variant, if at any time in the second variant no further impulses of a particular polarity need to be applied to any pixel, then the scans applying pulses of that polarity can be eliminated. This may mean that the entire pulse is shortened, for example, if the maximum impulse to be applied in both the positive and negative directions is less than the maximum allowable impulse.

To take a highly simplified case for purposes of illustration, consider the application of the gray scale scheme described above to a display having four gray levels, namely black (level 0), dark gray (level 1), light gray (level 2) and white (level 3). One possible drive scheme for such a display is summarized in Table 2 below.

TABLE 2

| Parity Transition | Frame No. | | | | | |
|---|---|---|---|---|---|---|
| | 1 | 2 | 3 | 4 | 5 | 6 |
| | Odd | Even | Odd | Even | Odd | Even |
| 0–3 | + | 0 | + | 0 | + | 0 |
| 0–2 | + | 0 | + | 0 | 0 | 0 |
| 0–1 | + | 0 | 0 | 0 | 0 | 0 |
| 0–0 | 0 | 0 | 0 | 0 | 0 | 0 |
| 3–0 | 0 | – | 0 | – | 0 | – |
| 2–0 | 0 | – | 0 | – | 0 | 0 |
| 1–0 | 0 | – | 0 | 0 | 0 | 0 |

For ease of illustration, this drive scheme is assumed to use only six frames although in practice a greater number would typically be employed. These frames are alternately odd and even. White-going transitions (i.e., transitions in which the gray level is increased) are driven only on the odd frames, while black-going transitions (i.e., transitions in which the gray level is decreased) are driven only on the even frames. On any frame when a pixel is not being driven, it is held at the same voltage as the common front electrode, as indicated by "0" in Table 2. For the 0-3 (black-white) transition, a white-going impulse is applied (i.e., the pixel electrode is held at a voltage relative to the common front electrode which tends to increase the gray level of the pixel) in each of the odd frames, Frames 1, 3 and 5. For a 0-2 (black to light gray) transition, on the other hand, a white-going impulse is applied only in Frames 1 and 3, and no impulse is applied in Frame 5; this is of course arbitrary, and, for example, a white-going impulse could be applied in Frames 1 and 5 and no impulse applied in Frame 3. For a 0-1 (black to dark gray) transition, a white-going impulse is applied only in Frame 1, and no impulse is applied in Frames 3 and 5; again, this is arbitrary, and, for example, a white-going impulse could be applied in Frame 3 and no impulse applied in Frames 1 and 5.

The black-going transitions are handled in a manner exactly similar to the corresponding white-going transitions except that the black-going impulses are applied only in the even frames of the drive scheme. It is believed that those skilled in driving electro-optic displays will readily be able to understand the manner in which the transitions not shown in Table 2 are handled from the foregoing description.

The sets of impulses described above can either be stand-alone transitions between two images (as in general image flow), or they may be part of a sequence of impulses designed to accomplish an image transition (as in a slide-show waveform).

Although emphasis has been laid above on methods of the present invention which permit the use of conventional drivers designed for use with LCD's, the present invention can make use of custom drivers, and a driver which is intended to enable accurate control of gray states in an electro-optic display, while achieving rapid writing of the display will now be described with reference to FIGS. 6 and 7.

As already discussed, to first order, many electro-optic media respond to a voltage impulse, which can be expressed as V times t(or more generally, by the integral of V with respect to t) where V is the voltage applied to a pixel and t is the time over which the voltage is applied. Thus, gray states can be obtained by modulating the length of the voltage pulse applied to the display, or by modulating the applied voltage, or by a combination of these two.

In the case of pulse width modulation in an active matrix display, the attainable pulse width resolution is simply the inverse of the refresh rate of the display. In other words, for a display with a 100 Hz refresh rate, the pulse length can be subdivided into 10 ms intervals. This is because each pixel in the display is only addressed once per scan, when the select line for the pixels in that row are activated. For the rest of the time, the voltage on the pixel may be maintained by a storage capacitor, as described in the aforementioned WO 01/07961. As the response speed of the electro-optic medium becomes faster, the slope of the reflectivity versus time curve becomes steeper and steeper. Thus, to maintain the same gray scale resolution, the refresh rate of the display must increase accordingly. Increasing the refresh rate results in higher power consumption, and eventually becomes impractical as the transistors and drivers are expected to charge the pixel and line capacitance in a shorter and shorter time.

On the other hand, in a voltage modulated display, the impulse resolution is simply determined by the number of voltage steps, and is independent of the speed of the electro-optic medium. The effective resolution can be increased by imposing a nonlinear spacing of the voltage steps, concentrating them where the voltage/reflectivity response of the electro-optic medium is steepest.

Figure 6:
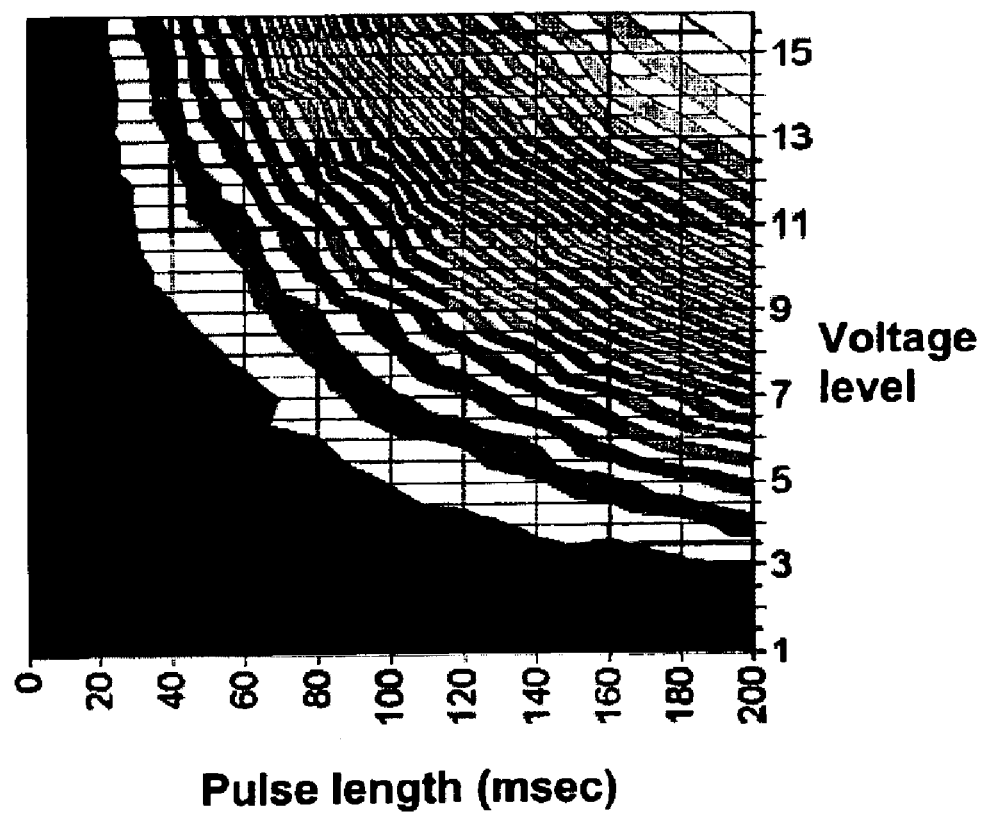
FIG. 6 is a schematic representation of tradeoffs between pulse width modulation and voltage modulation approaches in the look-up table method of the present invention.

FIG. 6 of the accompanying drawings is a schematic representation of the tradeoffs between the pulse width modulation (PWM) and voltage modulation (VM) approaches. The horizontal axis represents pulse length, while the vertical axis represents voltage. The reflectivity of the particle-based electrophoretic display as a function of these two parameters is represented as a contour plot, with the bands and spaces representing differences of 1 L* in the reflected luminance of the display, where L* has the usual ICE definition:

$$L^* = 116(R/R_0)^{1/3} - 16$$

where R is the reflectance and $R_0$ is a standard reflectance value. (It has been found empirically that a difference in luminance of 1 L* is just noticeable to an average subject in dual stimulus experiments.) This particular particle-based electrophoretic medium used in the experiments summarized in FIG. 6 had a response time of 200 ms at the maximum voltage (16 V) shown in the Figure.

The effects of pulse width modulation alone can be determined by traversing the plot horizontally along the top, while the effects of voltage modulation alone are seen by examining the right vertical edge. From this plot, it is clear that, if a display using this particular medium were driven at a refresh rate of 100 Hz in a pulse width modulation (PWM) mode, it would not be possible to obtain a reflectivity within ±1 L* in the middle gray region, where the contours are steepest. In voltage modulation (VM) mode, achieving a reflectivity within ±1 L* would require 128 equally spaced voltage levels, while running at a frame rate as low as 5 Hz (assuming, of course, that the voltage holding capability of the pixel, provided by a capacitor, is high enough). In addition, these two approaches can be combined to achieve the same accuracy with fewer voltage levels. To further reduce the required number of voltage levels, they could be concentrated in the steep middle portion of the curves shown in FIG. 6 but made sparse in the outer regions. This could be accomplished with a small number of input gamma voltages. To further reduce the required number of voltage levels, they could be concentrated at advantageous values. For example, very small voltages are not useful for achieving transitions if application of such a small voltage over the allotted address time is not sufficient to make any of the desired gray state transitions. Choosing a distribution of voltages that excludes such small voltages allows the allowed voltages to be more advantageously placed.

Since bistable electro-optic displays are sensitive to the polarity of the applied electric field, as noted above, it is not desirable to reverse the polarity of the drive voltage on successive frames (images), as is usually done with LCD's, and frame, pixel and line inversion are unnecessary, and indeed counterproductive. For example, LCD drivers with pixel inversion deliver voltages of alternating polarity in alternate frames. Thus, it is only possible to deliver an impulse of the proper polarity in one half of the frames. This is not a problem in an LCD, where the liquid crystal material in not sensitive to polarity, but in a bistable electro-optic display it doubles the time required to address the electro-optic medium.

Similarly, because bistable electro-optic displays are impulse transducers and not voltage transducers, the displays integrate voltage errors over time, which can result in large deviations of the pixels of the display from their desired optical states. This makes it important to use drivers with high voltage accuracy, and a tolerance of ±3 mV or less is recommended.

To enable a driver to address a monochrome XGA (1024× 768) display panel at a 75 Hz refresh rate, a maximum pixel clock rate of 60 MHz is required; achieving this clock rate is within the state of the art.

As already mentioned, one of the primary virtues of particle-based electrophoretic and other similar bistable electro-optic displays is their image stability, and the consequent opportunity to run the display at very low power consumption. To take maximum advantage of this opportunity, power to the driver should be disabled when the image is not changing. Accordingly, the driver should be designed to power down in a controlled manner, without creating any spurious voltages on the output lines. Because entering and leaving such a "sleep" mode will be a common occurrence, the power-down and power-up sequences should be as rapid as possible, and should have minimal effects on the lifetime of the driver.

In addition, there should be an input pin that brings all of the driver output pins to Vcom, which will hold all of the pixels at their current optical state without powering down the driver.

The drivers of the present invention are useful, inter alia, for driving medium to high resolution, high information content portable displays, for example a 7 inch (178 mm) diagonal XGA monochrome display. To minimize the number of integrated circuits required in such high resolution panels, it is desirable to use drivers with a high number (for example, 324) of outputs per package. It is also desirable that the driver have an option to run in one or more other modes with fewer of its outputs enabled. The preferred method for attaching the integrated circuits to the display panel is tape carrier package (TCP), so it is desirable to arrange the sizing and spacing of the driver outputs to facilitate use of this method.

The present drivers will typically be used to drive small to medium active matrix panels at around 30 V. Accordingly, the drivers should be capable of driving capacitative loads of approximately 100 pF.

Figure 7:
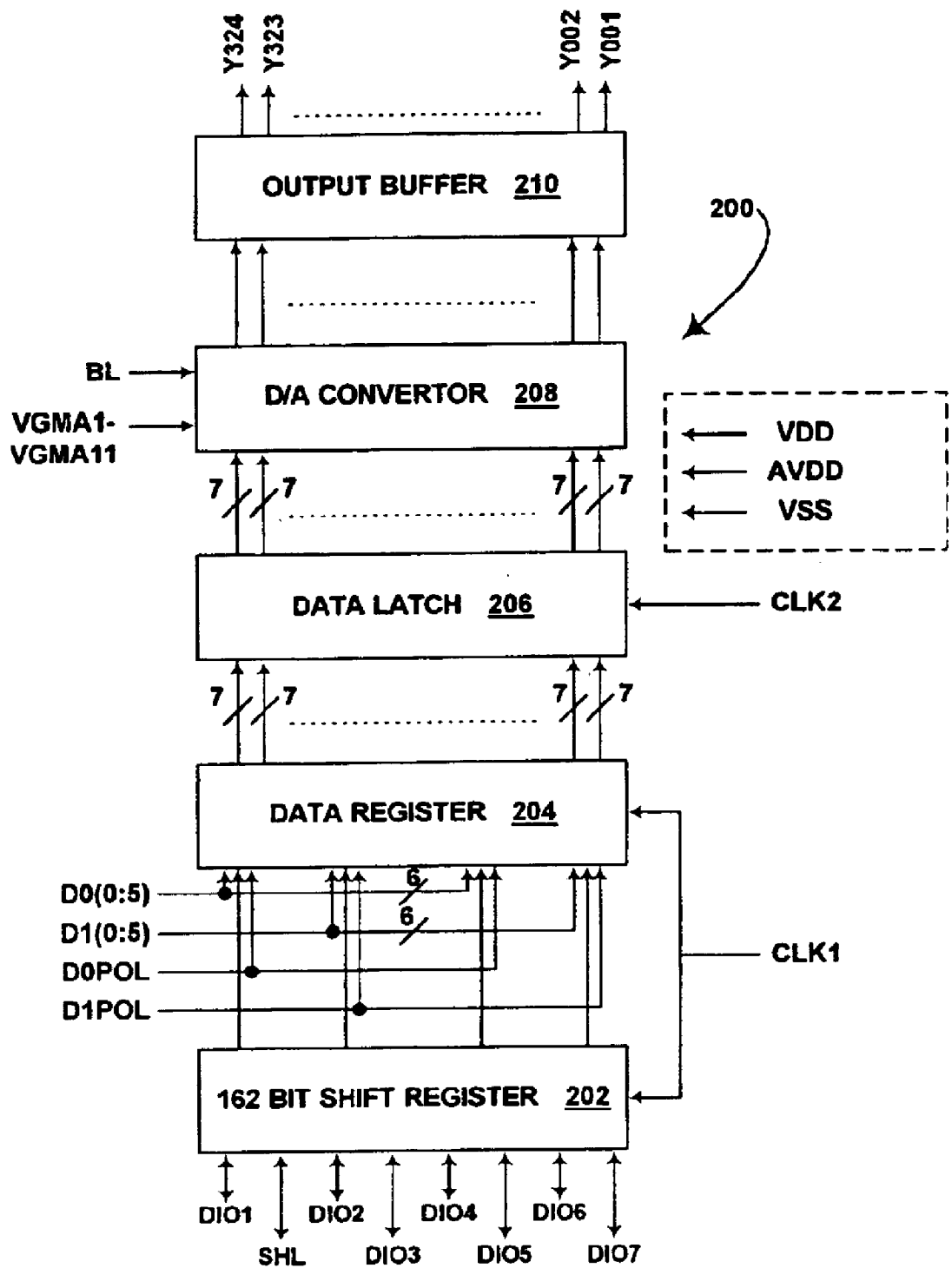
FIG. 7 is a block diagram of a custom driver useful in the look-up table method of the present invention.

A block diagram of a preferred driver (generally designated 200) of the invention is given in FIG. 7 of the accompanying drawings. This driver 200 comprises a shift register 202, a data register 204, a data latch 206, a digital to analogue converter (DAC) 208 and an output buffer 210.

This driver differs from those typically used to drive LCD's in that it provides for a polarity bit associated with each pixel of the display, and for generating an output above or below the top plane voltage controlled by the relevant polarity bit.

The signal descriptions for this preferred driver are given in the following Table 3:

TABLE 3

| Symbol | Pin Name | Description |
|---|---|---|
| VDD | Logic power supply | 2.7–3.6 V |
| AVDD | Driver power supply | 10–30 V |
| VSS | Ground | 0 V |
| Y1–Y324 | Driver outputs, fed to the column electrodes of the display | D/A converted 64 level analog outputs |
| D0(0:5) | Display data input, odd dots | 6 bit gray scale data for odd dots, D0:0 = least significant bit (LSB) |
| D1(0:5) | Display data input, even dots | 6 bit gray scale data for even dots, D1:0 LSB |
| D0POL | Odd dot polarity control input | Determines which set of gamma voltages current odd dot will reference. D0POL = 1: odd dot will reference VGAM6–11 D0POL = 0: odd dot will reference VGAM1–6 |
| D1POL | Even dot polarity control input | Determines which set of gamma voltages current even dot will reference. D1POL = 1: odd dot will reference VGAM6–11 D1POL = 0: odd dot will reference VGAM1–6 |
| SHL | Shift direction control input | Controls shift direction in 162 bit shift register SHL = H: DIO1 input, Y1 -> Y324 SHL = L: DIO1 output, Y324 -> Y1 |
| DIO1 | Start pulse input/output | SHL = H: Used as the start pulse input pin SHL = L: Used as the start pulse output pin |
| DIO2 | Start pulse input/output for 256 lines | SHL = H: Used as the start pulse output pin for 256 lines active SHL = L: Used as the start pulse input pin for 256 lines, tie low if not used |
| DIO3 | Start pulse input/output for 260 lines | SHL = H: Used as the start pulse output pin for 260 lines active SHL = L: Used as the start pulse input pin for 260 lines, tie low if not used |
| DIO4 | Start pulse input/output for 300 lines | SHL = H: Used as the start pulse output pin for 300 lines active SHL = L: Used as the start pulse input pin for 300 lines, tie low if not used |
| DIO5 | Start pulse input/output for 304 lines | SHL = H: Used as the start pulse output pin for 304 lines active SHL = L: Used as the start pulse input pin for 304 lines, tie low if not used |
| DIO6 | Start pulse input/output for 320 lines | SHL = H: Used as the start pulse output pin for 320 lines active SHL = L: Used as the start pulse input pin for 320 lines, tie low if not used |
| DIO7 | Start pulse input/output for 324 lines | SHL = H: Used as the start pulse output pin for 324 lines active SHL = L: Used as the start pulse input pin for 324 lines, tie low if not used |
| CLK1 | Shift clock input | Two 6 bit gray values and two polarity control values for two display dots are loaded at every rising edge |

TABLE 3-continued

| Symbol | Pin Name | Description |
| --- | --- | --- |
| CLK2 | Latch input | Latches the contents of the data register on a rising edge and transfers latched values to the D/A converter block. |
| BL | Blanking input (this does not actually blank the bistable display, but simply stops the driver writing to ths display, thus allowing the image already written to remain) | Sets all outputs to VGAM6 level BL = H: All outputs set to VGAM6 BL = L: All outputs reflect D/A values |
| VGAM1–6 | Lower gamma reference voltages | Determine grayscale voltage outputs through resistive DAC system |
| VGAM6–11 | Upper gamma reference voltages | Determine grayscale voltage outputs through resistive DAC system |

The driver 200 operates in the following manner. First, a start pulse is provided by setting (say) DIO1 high to reset the shift register 202 to a starting location. (As will readily be apparent to those skilled in display driver technology, the various DIOx inputs to the shift register are provided to enable the driver to be used with displays having varying numbers of columns, and only one of these inputs is used with any given display, the others being tied permanently low.) The shift register now operates in the conventional manner used in LCD's; at each pulse of CLK1, one and only one of the 162 outputs of the shift register 202 goes high, the others being held low, and the high output being shifted one place at each pulse of CLK1. As schematically indicated in FIG. 7, each of the 162 outputs of the shift register 202 is connected to two inputs of data register 204, one odd input and one even input.

The display controller (cf. FIG. 2) provides two six-bit impulse values D0(0:5) and D1(0:5) and two single-bit polarity signals D0POL and D1POL on the inputs of the data register 204. At the rising edge of each clock pulse CLK1, two seven-bit numbers (D0POL+D0(0:5) and D1POL+D1(0:5)) are written into registers in data register 204 associated with the selected (high) output of shift register 202. Thus, after 162 clock pulses CLK1, 324 seven-bit numbers (corresponding to the impulse values for one complete line of the display for one frame) have been written into the 324 registers present in data register 204.

At the rising edge of each clock pulse CLK2, these 324 seven-bit numbers are transferred from the data register 204 to the data latch 206. The numbers thus placed in the data latch 206 are read by the DAC 208 and, in conventional fashion, corresponding analogue values are placed on the outputs of the DAC 208 and fed, via the buffer 210 to the column electrodes of the display, where they are applied to pixel electrodes of one row selected in conventional fashion by a row driver (not shown). It should be noted, however, that the polarity of each column electrode with respect to Vcom is controlled by the polarity bit D0POL or D1POL written into the data latch 206 and thus these polarities do not alternate between adjacent column electrodes in the conventional manner used in LCD's.

Figure 8:
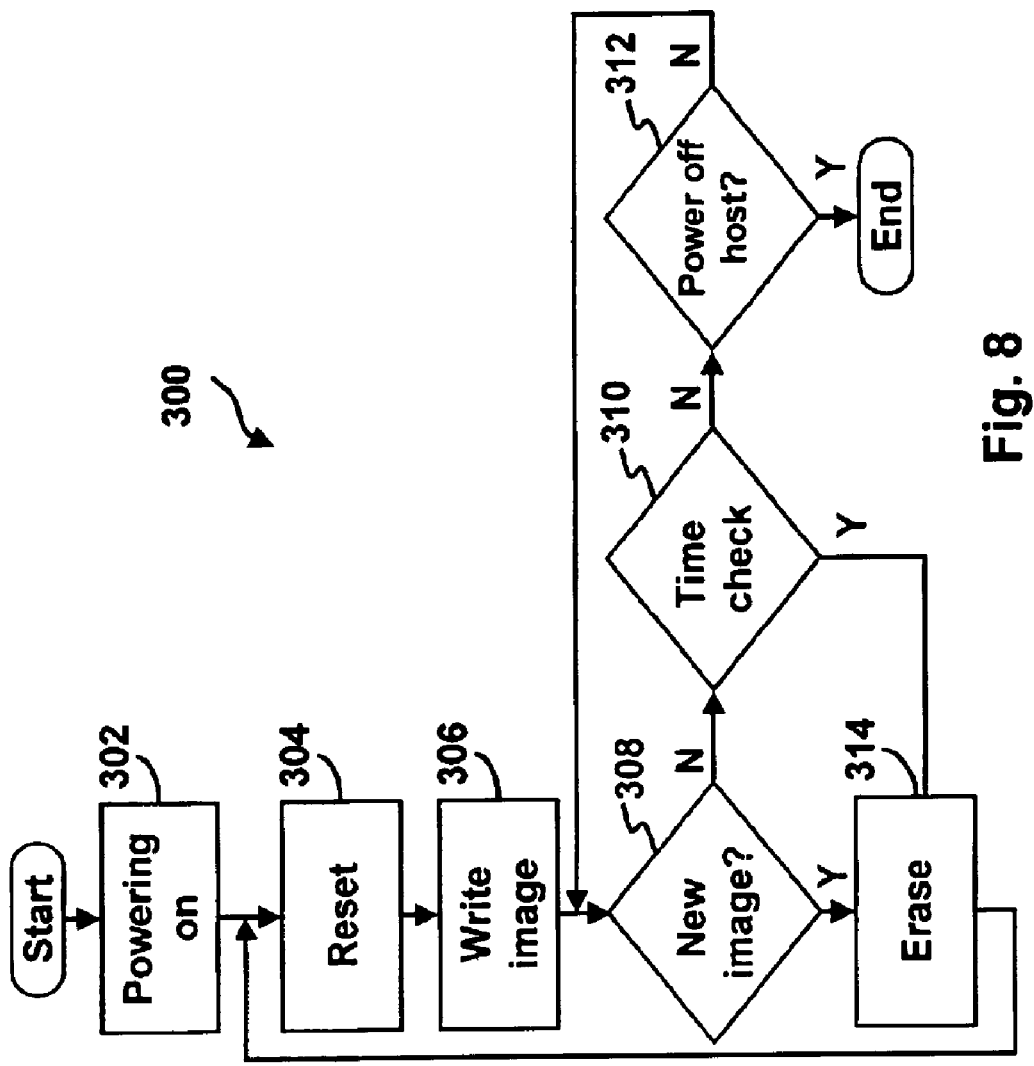
FIG. 8 is a flow chart illustrating a program which may be run by the controller unit shown in FIGS. 1 and 2.

FIG. 8 is a flow chart illustrating a program which may be run by the controller unit shown in FIGS. 1 and 2. This program (generally designated 300) is intended for use with a look-up table method of the invention (described in more detail below) in which all pixels of a display are erased and then re-addressed each time an image is written or refreshed.

The program begins with a "powering on" step 302 in which the controller is initialized, typically as a result of user input, for example a user pushing the power button of a personal digital assistant (PDA). The step 302 could also be triggered by, for example, the opening of the case of a PDA (this opening being detected either by a mechanical sensor or by a photodetector), by the removal of a stylus from its rest in a PDA, by detection of motion when a user lifts a PDA, or by a proximity detector which detects when a user's hand approaches a PDA.

The next step 304 is a "reset" step in which all the pixels of the display are driven alternately to their black and white states. It has been found that, in at least some electro-optic media, such "flashing" of the pixels is necessary to ensure accurate gray states during the subsequent writing of an image on the display. It has also been found that typically at least 5 flashes (counting each successive black and white state as one flash) are required, and in some cases more. The greater the number of flashes, the more time and energy that this step consumes, and thus the longer the time that must elapse before the user can see a desired image upon the display. Accordingly, it is desirable that the number of flashes be kept as small as possible consistent with accurate rendering of gray states in the image subsequently written. At the conclusion the reset step 304, all the pixels of the display are in the same black or white state.

The next step 306 is a writing or "sending out image" step in which the controller 16 sends out signals to the row and column drivers 22 and 24 respectively (FIGS. 1 and 2) in the manner already described, thus writing a desired image on the display. Since the display is bistable, once the image has been written, it does not need to be rewritten immediately, and thus after writing the image, the controller can cause the row and column drivers to cease writing to the display, typically by setting a blanking signal (such as setting signal BL in FIG. 7 high).

The controller now enters a decision loop formed by steps 308, 310 and 312. In step 308, the controller 16 checks whether the computer 12 (FIG. 1) requires display of a new image. If so, the controller proceeds, in an erase step 314 to erase the image written to the display at step 306, thus essentially returning the display to the state reached at the end of reset step 304. From erase step 314, the controller returns to step 304, resets as previously described, and proceeds to write the new image.

If at step 308 no new image needs to be written to the display, the controller proceeds to a step 310, at which it determines when the image has remained on the display for more than a predetermined period. As is well known to those skilled in display technology, images written on bistable media do not persist indefinitely, and the images gradually fade (i.e., lose contrast). Furthermore, in some types of electro-optic medium, especially electrophoretic media, there is often a trade-off between writing speed of the medium and bistability, in that media which are bistable for hours or days have substantially longer writing times than media which are only bistable for seconds or minutes. Accordingly, although it is not necessary to rewrite the electro-optic medium continuously, as in the case of LCD's, to provide an image with good contrast, it may be desirable to refresh the image at intervals of (say) a few minutes. Thus, at step 310 the controller determines whether the time which has elapsed since the image was written at step 306 exceeds some predetermined refresh interval, and if so the controller proceeds to erase step 314 and then to reset step 304, resets the display as previously described, and proceeds to rewrite the same image to the display.

(The program shown in FIG. 8 may be modified to make use of both local and global rewriting, as discussed in more detail below. If so, step 310 may be modified to decide whether local or global rewriting is required. If, in this modified program, at step 310 the program determines that the predetermined time has not expired, no action is taken. If, however, the predetermined time has expired, step 310 does not immediately invoke erasure and rewriting of the image; instead step 310 simply sets a flag (in the normal computer's sense of that term) indicating that the next image update should be effected globally rather than locally. The next time the program reaches step 306, the flag is checked; if the flag is set, the image is rewritten globally and then the flag is cleared, but if the flag is not set, only local rewriting of the image is effected.)

If at step 310 it is determined that the refresh interval has not been exceeded, the controller proceeds to a step 312, where it determines whether it is time to shut down the display and/or the image source. In order to conserve energy in a portable apparatus, the controller will not allow a single image to be refreshed indefinitely, and terminates the program shown in FIG. 8 after a prolonged period of inactivity. Accordingly, at step 310 the controller determines whether a predetermined "shut-down" period (greater than the refresh interval mentioned above) has elapsed since a new image (rather than a refresh of a previous image) was written to the display, and if so the program terminates, as indicated at 314. Step 314 may include powering down the image source. Naturally, the user still has access to a slowly-fading image on the display after such program termination. If the shut-down period has not been exceeded, the controller proceeds from step 312 back to step 308.

Various possible waveforms for carrying out the look-up table method of the present invention will now be described, though by way of example only. However, first some general considerations regarding waveforms to be used in the present invention will be discussed.

Waveforms for bistable displays that exhibit the aforementioned memory effect can be grouped into two major classes, namely compensated and uncompensated. In a compensated waveform, all of the pulses are precisely adjusted to account for any memory effect in the pixel. For example, a pixel undergoing a series of transitions through gray scale levels 1-3-4-2 might receive a slightly different impulse for the 4-2 transition than a pixel that undergoes a transition series 1-2-4-2. Such impulse compensation could occur by adjusting the pulse length, the voltage, or by otherwise changing the V(t) profile of the pulses. In an uncompensated waveform, no attempt is made to account for any prior state information (other than the initial state). In an uncompensated waveform, all pixels undergoing the 4-2 transition would receive precisely the same pulse. For an uncompensated waveform to work successfully, one of two criteria must be met. Either the electro-optic material must not exhibit a memory effect in its switching behavior, or each transition must effectively eliminate any memory effect on the pixel.

In general, uncompensated waveforms are best suited for use with systems capable of only coarse impulse resolution. Examples would be a display with tri-level drivers, or a display capable of only 2–3 bits of voltage modulation. A compensated waveform requires fine impulse adjustments, which are not possible with these systems. Obviously, while a coarse-impulse system is preferably restricted to uncompensated waveforms, a system with fine impulse adjustment can implement either type of waveform.

The simplest uncompensated waveform is 1-bit general image flow (1-bit GIF). In 1-bit GIF, the display transitions smoothly from one pure black-and-white image to the next. The transition rule for this sequence can be stated simply: If a pixel is switching from white to black, then apply an impulse I. If it is switching from black to white, apply the impulse of the opposite polarity, –I. If a pixel remains in the same state, then no impulse is applied to that pixel. As previously stated, the mapping of the impulse polarity to the voltage polarity of the system will depend upon the response function of the material.

Another uncompensated waveform that is capable of producing grayscale images is the uncompensated n-prepulse slide show (n-PP SS). The uncompensated slide show waveform has three basic sections. First, the pixels are erased to a uniform optical state, typically either white or black. Next, the pixels are driven back and forth between two optical states, again typically white and black. Finally, the pixel is addressed to a new optical state, which may be one of several gray states. The final (or writing) pulse is referred to as the addressing pulse, and the other pulses (the first (or erasing) pulse and the intervening (or blanking) pulses) are collectively referred to as prepulses. A waveform of this type will be described below with reference to FIGS. 9 and 10.

Prepulse slide show waveforms can be divided into two basic forms, those with an odd number of prepulses, and those with an even number of prepulses. For the odd-prepulse case, the erasing pulse may be equal in impulse and opposite in polarity to the immediately previous writing pulse (again, see FIG. 9 and discussion thereof below). In other words, if the pixel is written to gray from black, the erasing pulse will take the pixel back to the black state. In the even-prepulse case, the erasing pulse should be of the same polarity as the previous writing pulse, and the sum of the impulses of the previous writing pulse and the erasing pulse should be equal to the impulse necessary to fully transition from black to white. In other words, if a pixel is written from black in the even-prepulse case, then it must be erased to white.

After the erasing pulse, the waveform includes either zero or an even number of blanking pulses. These blanking pulses are typically pulses of equal impulse and opposite polarity, arranged so that the first pulse is of opposite polarity to the erasing pulse. These pulses will generally be equal in impulse to a full black-white pulse, but this is not necessarily the case. It is also only necessary that pairs of pulses have equal and opposite impulses it is possible that there may be pairs of widely varying impulses chained together, i.e. +I, –I, +0.1I, –0.1I, +4I, –4I.

The last pulse to be applied is the writing pulse. The impulse of this pulse is chosen based only upon the desired optical state (not upon the current state, or any prior state). In general, but not necessarily, the pulse will increase or decrease monotonically with gray state value. Since this waveform is specifically designed for use with coarse impulse systems, the choice of the writing pulse will generally involve mapping a set of desired gray states onto a small number of possible impulse choices, e.g. 4 gray states onto 9 possible applied impulses.

Examination of either the even or odd form of the uncompensated n-prepulse slide show waveform will reveal that the writing pulse always begins from the same direction, i.e. either from black or from white. This is an important feature of this waveform. Since the principle of the uncompensated waveform is that the pulse length can not be compensated accurately to ensure that pixels reach the same optical state, one cannot to expect to reach an identical optical state when approaching from opposite extreme optical states (black or white). Accordingly, there are two possible, polarities for either of these forms, which can be labeled "from black" and "from white."

One major shortcoming of this type of waveform is that it has large-amplitude optical flashes between images. This can be improved by shifting the update sequence by one superframe time for half of the pixels, and interleaving the pixels at high resolution, as discussed below with reference to FIGS. 9 and 10. Possible patterns include every other row, every other column, or a checkerboard pattern. Note, this does not mean using the opposite polarity, i.e. "from black" vs "from white", since this would result in non-matching gray scales on neighboring pixels. Instead, this can be accomplished by delaying the start of the update by one "superframe" (a grouping of frames equivalent to the maximum length of a black-white update) for half of the pixels (i.e. the first set of pixels completes the erase pulse, then the second set of pixels begin the erase pulse as the first set of pixels begin the first blanking pulse). This will require the addition of one superframe for the total update time, to allow for this synchronization.

It might at first appear that the ideal method of the present invention would be so-called "general grayscale image flow" in which the controller arranges each writing of an image so that each pixel transitions directly from its initial gray level to its final gray level. In practice, however, general grayscale image flow suffers from an accumulation of errors problem. The impulse applied in any given grayscale transition will necessarily differ from that theoretically necessary because of facts such as unavoidable variations in the voltages output by drivers, manufacturing variations in the thickness of the electro-optic medium, etc. Suppose that the average error on each transition, expressed in terms of the difference between the theoretical and the actual reflectance of the display is ±0.2 L*. After 100 successive transitions, the pixels will display an average deviation from their expected state of 2 L*; such deviations are apparent to the average observer on certain types of images. To avoid this problem, it may be desirable to arrange the drive scheme used in the present invention so that any given pixel can only undergo a predetermined maximum number of gray scale transitions before passing through one extreme optical state (black or white). These extreme optical states act as "rails" in that after a particular impulse has been applied to an electro-optic medium, the medium cannot become any blacker or whiter. Thus, the next transition away from the extreme optical state can start from an accurately known optical state, in effect canceling out any previously accumulated errors. Various techniques for minimizing the optical effects of such passage of pixels through extreme optical states are discussed below.

A first, simple drive scheme useful in the present invention will now be described with reference to a simple two-bit gray scale system having black (level 0), dark gray (level 1), light gray (level 2) and white (level 3) optical states, transitions being effected using a pulse width modulation technique, and a look-up table for transitions as set out in Table 4 below.

TABLE 4

| Transition | Impulse | Transition | Impulse |
|---|---|---|---|
| 0–0 | 0 | 0–0 | 0 |
| 0–1 | n | 1–0 | −n |
| 0–2 | 2n | 2–0 | −2n |
| 0–3 | 3n | 3–0 | −3n | where n is a number dependent upon the specific display, and −n indicates a pulse having the same length as a pulse n but of opposite polarity. It will further be assumed that at the end of the reset pulse 304 in FIG. 8 all the pixels of the display are black (level 0). Since, as described below, all transitions take place through an intervening black state, the only transitions effected are those to or from this gray state. Thus, the size of the necessary look-up table is significantly reduced, and obviously the factor by which look-up table size is thus reduced increases with the number of gray levels of the display.

Figure 9:
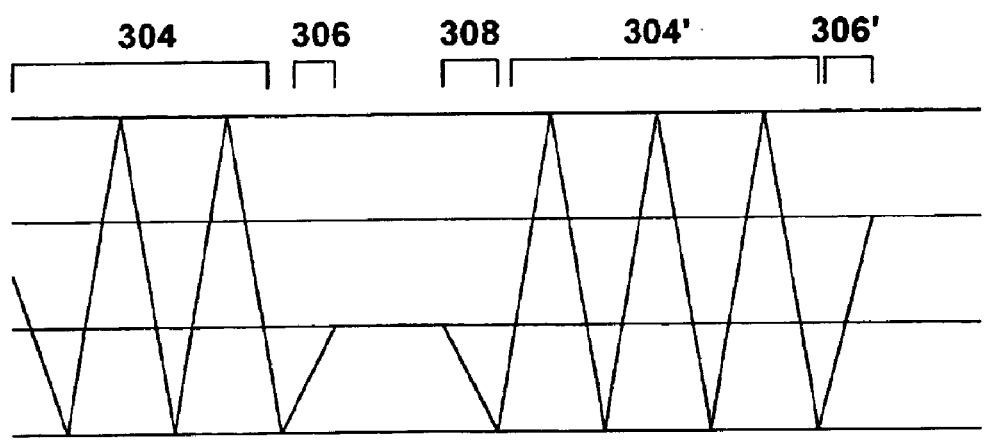
FIGS. 9 and 10 illustrate two drive schemes of the present invention.

FIG. 9 shows the transitions of one pixel associated with the drive scheme of FIG. 8. At the beginning of the reset step 304, the pixel is in some arbitrary gray state. During the reset step 304, the pixel is driven alternately to three black states and two intervening white states, ending in its black state. The pixel is then, at 306, written with the appropriate gray level for a first image, assumed to be level 1. The pixel remains at this level for some time during which the same image is displayed; the length of this display period is greatly reduced in FIG. 9 for ease of illustration. At some point, a new image needs to be written, and at this point, the pixel is returned to black (level 0) in erase step 308, and is then subjected, in a second reset step designated 304', to six reset pulses, alternately white and black, so that at the end of this reset step 304', the pixel has returned to a black state. Finally, in a second writing step designated 306', the pixel is written with the appropriate gray level for a second image, assumed to be level 2.

Figure 10:
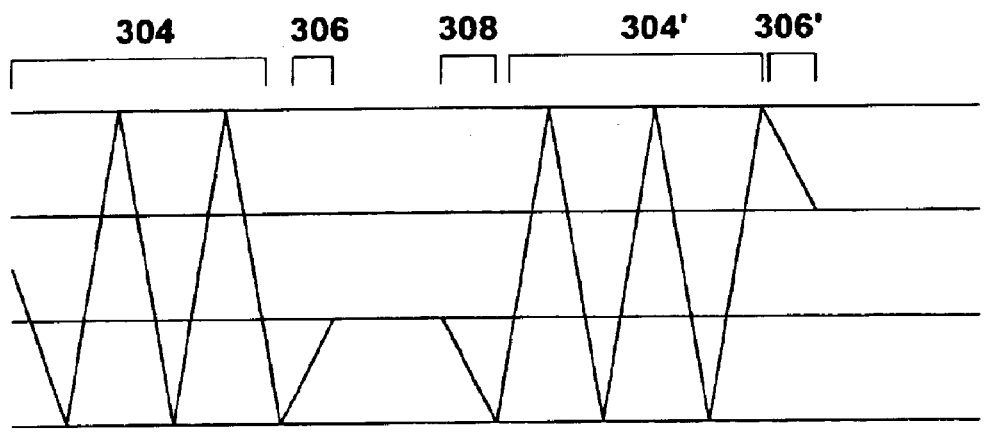

Numerous variations of the drive scheme shown in FIG. 9 are of course possible. One useful variation is shown in FIG. 10. The steps 304, 306 and 308 shown in FIG. 10 are identical to those shown in FIG. 9. However, in step 304', five reset pulses are used (obviously a different odd number of pulses could also be used), so that at the end of step 304', the pixel is in a white state (level 3), and in the second writing step 306', writing of the pixel is effected from this white state rather than the black state as in FIG. 9. Successive images are then written alternately from black and white states of the pixel.

In a further variation of the drive schemes shown in FIGS. 9 and 10, erase step 308 is effected to as to drive the pixel white (level 3) rather than black. An even number of reset pulses are then applied to that the pixel ends the reset step in a white state, and the second image is written from this white state. As with the drive scheme shown in FIG. 10, in this scheme successive images are written alternately from black and white states of the pixel.

It will be appreciated that in all the foregoing schemes, the number and duration of the reset pulses can be varied depending upon the characteristics of the electro-optic medium used. Similarly, voltage modulation rather than pulse width modulation may be used to vary the impulse applied to the pixel.

The black and white flashes which appear on the display during the reset steps of the drive schemes described above are of course visible to the user and may be objectionable to many users. To lessen the visual effect of such reset steps, it is convenient to divide the pixels of the display into two (or more) groups and to apply different types of reset pulses to the different groups. More specifically, if it necessary to use reset pulses which drive any given pixel alternately black and white, it is convenient to divide the pixels into at least two groups and to arrange the drive scheme so that one group of pixels are driven white at the same time that another group are driven black. Provided the spatial distribution of the two groups is chosen carefully and the pixels are sufficiently small, the user will experience the reset step as an interval of gray on the display (with perhaps some slight flicker), and such a gray interval is typically less objectionable than a series of black and white flashes.

For example, in one form of such a "two group reset" step, the pixel in odd-numbered columns may be assigned to one "odd" group and the pixels in the even-numbered columns to the second "even" group. The odd pixels could then make use of the drive scheme shown in FIG. 9, while the even pixels could make use of a variant of this drive scheme in which, during the erase step, the pixels are driven to a white rather a black state. Both groups of pixels would then be subjected to an even number of reset pulses during reset step 304', so that the reset pulses for the two groups are essentially 180° out of phase, and the display appears gray throughout this reset step. Finally, during the writing of the second image at step 306', the odd pixels are driven from black to their final state, while the even pixels are driven from white to their final state. In order to ensure that every pixel is reset in the same manner over the long term (and thus that the manner of resetting does not introduce any artifacts on to the display), it is advantageous for the controller to switch the drive schemes between successive images, so that as a series of new images are written to the display, each pixel is written to its final state alternately from black and white states.

Obviously, a similar scheme can be used in which the pixels in odd-numbered rows form the first group and the pixels in even-numbered rows the second group. In a further similar drive scheme, the first group comprises pixels in odd-numbered columns and odd-numbered rows, and even-numbered columns and even-numbered rows, while the second group comprises in odd-numbered columns and even-numbered rows, and even-numbered columns and odd-numbered rows, so that the two groups are disposed in a checkerboard fashion.

Instead of or in addition to dividing the pixels into two groups and arranging for the reset pulses in one group to be 180° out of phase with those of the other group, the pixels may be divided into groups which use different reset steps differing in number and frequency of pulses. For example, one group could use the six pulse reset sequence shown in FIG. 9, while the second could use a similar sequence having twelve pulses of twice the frequency. In a more elaborate scheme, the pixels could be divided into four groups, with the first and second groups using the six pulse scheme but 180° out of phase with each other, while the third and fourth groups use the twelve pulse scheme but 180° out of phase with each other.

Another scheme for reducing the objectionable effects of reset steps will now be described with reference to FIGS. 11A and 11B. In this scheme, the pixels are again divided into two groups, with the first (even) group following the drive scheme shown in FIG. 11A and the second (odd) group following the drive scheme shown in FIG. 11B. Also in this scheme, all the gray levels intermediate black and white are divided into a first group of contiguous dark gray levels adjacent the black level, and a second group of contiguous light gray levels adjacent the white level, this division being the same for both groups of pixels. Desirably but not essentially, there are the same number of gray levels in these two groups; if there are an odd number of gray levels, the central level may be arbitrarily assigned to either group. For ease of illustration, FIGS. 11A and 11B show this drive scheme applied to an eight-level gray scale display, the levels being designated 0 (black) to 7 (white); gray levels 1, 2 and 3 are dark gray levels and gray levels 4, 5 and 6 are light gray levels.

Figure 11A:
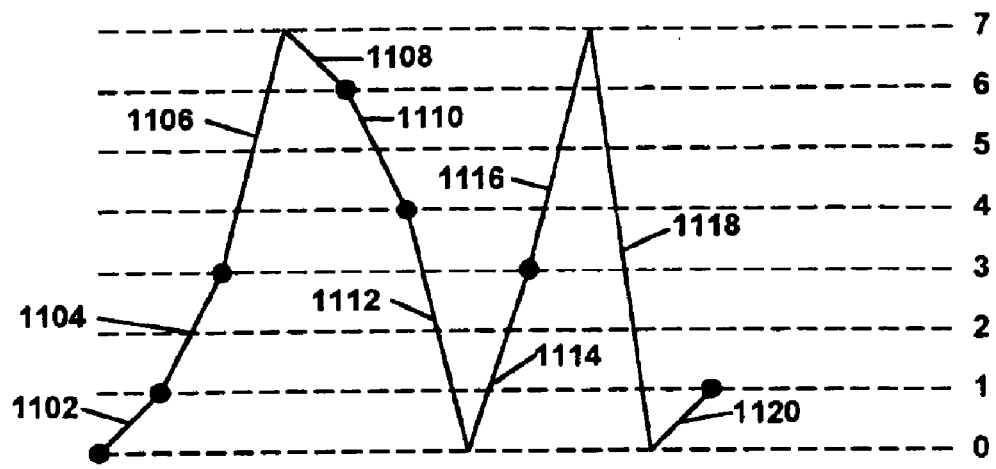
FIGS. 11A and 11B illustrate two parts of a third drive scheme of the present invention.
Figure 11B:
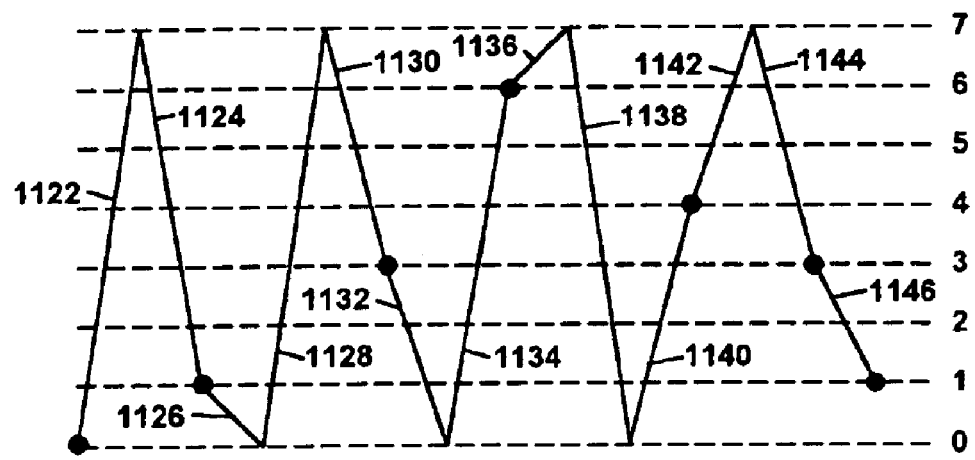

In the drive scheme of FIGS. 11A and 11B, gray to gray transitions are handled according to the following rules:

(a) in the first, even group of pixels, in a transition to a dark gray level, the last pulse applied is always a white-going pulse (i.e., a pulse having a polarity which tends to drive the pixel from its black state to its white state), whereas in a transition to a light gray level, the last pulse applied is always a black-going pulse;

(b) in the second, odd group of pixels, in a transition to a dark gray level, the last pulse applied is always a black-going pulse, whereas in a transition to a light gray level, the last pulse applied is always a white-going pulse;

(c) in all cases, a black-going pulse may only succeed a white-going pulse after a white state has been attained, and a white-going pulse may only succeed a black-going pulse after a black state has been attained; and (d) even pixels may not be driven from a dark gray level to black by a single black-going pulse nor odd pixels from a light gray level to white using a single white-going pulse.

(Obviously, in both cases, a white state can only be achieved using a final white-going pulse and a black state can only be achieved using a final black-going pulse.)

The application of these rules allows each gray to gray transition to be effected using a maximum of three successive pulses. For example, FIG. 11A shows an even pixel undergoing a transition from black (level 0) to gray level 1. This is achieved with a single white-going pulse (shown of course with a positive gradient in FIG. 11A) designated 1102. Next, the pixel is driven to gray level 3. Since gray level 3 is a dark gray level, according to rule (a) it must be reached by a white-going pulse, and the level 1/level 3 transition can thus be handled by a single white-going pulse 1104, which has an impulse different from that of pulse 1102.

The pixel is now driven to gray level 6. Since this is a light gray level, it must, by rule (a) be reached by a black-going pulse. Accordingly, application of rules (a) and (c) requires that this level 3/level 6 transition be effected by a two-pulse sequence, namely a first white-going pulse 1106, which drives the pixel white (level 7), followed by a second black-going pulse 1108, which drives the pixel from level 7 to the desired level 6.

The pixel is next driven to gray level 4. Since this is a light gray level, by an argument exactly similar to that employed for the level 1/level 3 transition discussed earlier, the level 6/level 4 transition is effected by a single black-going pulse 1110. The next transition is to level 3. Since this is a dark gray level, by an argument exactly similar to that employed for the level 3/level 6 transition discussed earlier, the level 4/level 3 transition is handled by a two-pulse sequence, namely a first black-going pulse 1112, which drives the pixel black (level 0), followed by a second white-going pulse 1114, which drives the pixels from level 0 to the desired level 3.

The final transition shown in FIG. 11A is from level 3 to level 1. Since level 1 is a dark gray level, it must, according to rule (a) be approached by a white-going pulse. Accordingly, applying rules (a) and (c), the level 3/level 1 transition must be handled by a three-pulse sequence comprising a first white-going pulse 1116, which drives the pixel white (level 7), a second black-going pulse 1118, which drives the pixel black (level 0), and a third white-going pulse 1120, which drives the pixel from black to the desired level 1 state.

FIG. 11B shows an odd pixel effecting the same 0-1-3-6-4-3-1 sequence gray states as the even pixel in FIG. 11A. It will be seen, however, that the pulses sequences employed are very different. Rule (b) requires that level 1, a dark gray level, be approached by a black-going pulse. Hence, the 0-1 transition is effected by a first white-going pulse 1122, which drives the pixel white (level 7), followed by a black-going pulse 1124, which drives the pixel from level 7 to the desired level 1. The 1-3 transition requires a three-pulse sequence, a first black-going pulse 1126, which drives the pixel black (level 0), a second white-going pulse 1128, which drives the pixel white (level 7), and a third black-going pulse 1130, which drives the pixel from level 7 to the desired level 3. The next transition is to level 6 is a light gray level, which according to rule (b) is approached by a white-going pulse, the level 3/level 6 transition is effected by a two-pulse sequence comprising a black-going pulse 1132, which drives the pixel black (level 0), and a white-going pulse 134, which drives the pixel to the desired level 6. The level 6/level 4 transition is effected by a three-pulse sequence, namely a white-going pulse 1136, which drives the pixel white (level 7), a black-going pulse 1138, which drives the pixel black (level 0) and a white-going pulse 1140, which drives the pixel to the desired level 4. The level 4/level transition 3 transition is effected by a two-pulse sequence comprising a white-going pulse 1142, which drives the pixel white (level 7), followed by a black-going pulse 1144, which drives the pixel to the desired level 3. Finally, the level 3/level 1 transition is effected by a single black-going pulse 1146.

It will be seen from FIGS. 11A and 11B that this drive scheme ensures that each pixel follows a "sawtooth" pattern in which the pixel travels from black to white without change of direction (although obviously the pixel may rest at any intermediate gray level for a short or long period), and thereafter travels from white to black without change of direction. Thus, rules (c) and (d) above may be replaced by a single rule (e) as follows:

(e) once a pixel has been driven from one extreme optical state (i.e., white or black) towards the opposed extreme optical state by a pulse of one polarity, the pixel may not receive a pulse of the opposed polarity until it has reached the aforesaid opposed extreme optical state.

Thus, this drive scheme ensures that a pixel can only undergo, at most, a number of transitions equal to (N−1)/2 transitions, where N is the number of gray levels, before being driven to one extreme optical state; this prevents slight errors in individual transitions (caused, for example, by unavoidable minor fluctuations in voltages applied by drivers) accumulating indefinitely to the point where serious distortion of a gray scale image is apparent to an observer. Furthermore, this drive scheme is designed so that even and odd pixels always approach a given intermediate gray level from opposed directions, i.e., the final pulse of the sequence is white-going in one case and black-going in the other. If a substantial area of the display, containing substantially equal numbers of even and odd pixels, is being written to a single gray level, this "opposed directions" feature minimizes flashing of the area.

For reasons similar to those discussed above relating to other drive schemes which divide pixels into two discrete groups, when implementing the sawtooth drive scheme of FIGS. 11A and 11B, careful attention should be paid to the arrangements of the pixels in the even and odd groups. This arrangement will desirably ensure that any substantially contiguous area of the display will contain a substantially equal number of odd and even pixels, and that the maximum size of a contiguous block of pixels of the same group is sufficiently small not to be readily discernable by an average observer. As already discussed, arranging the two groups of pixels in a checkerboard pattern meets these requirements. Stochastic screening techniques may also be employed to arrange the pixels of the two groups.

However, in this sawtooth drive scheme, use of a checkerboard pattern tends to increase the energy consumption of the display. In any given column of such a pattern, adjacent pixels will belong to opposite groups, and in a contiguous area of substantial size in which all pixels are undergoing the same gray level transition (a not uncommon situation), the adjacent pixels will tend to require impulses of opposite polarity at any given time. Applying impulses of opposite polarity to consecutive pixels in any column requires discharging and recharging the column (source) electrodes of the display as each new line is written. It is well known to those skilled in driving active matrix displays that discharging and recharging column electrodes is a major factor in the energy consumption of a display. Hence, a checkerboard arrangement tends to increase the energy consumption of the display.

A reasonable compromise between energy consumption and the desire to avoid large contiguous areas of pixels of the same group is to have pixels of each group assigned to rectangles, the pixels of which all lie in the same column but extend for several pixels along that column. With such an arrangement, when rewriting areas having the same gray level, discharging and recharging of the column electrodes will only be necessary when shifting from one rectangle to the next. Desirably, the rectangles are 1×4 pixels, and are arranged so that rectangles in adjacent columns do not end on the same row, i.e., the rectangles in adjacent columns should have differing "phases". The assignment of rectangles in columns to phases may be effected either randomly or in a cyclic manner.

One advantage of the sawtooth drive scheme shown in FIGS. 11A and 11B is that any areas of the image which are monochrome are simply updated with a single pulse, either black to white or white to black, as part of the overall updating of the display. The maximum time taken for rewriting such monochrome areas is only one-half of the maximum time for rewriting areas which require gray to gray transitions, and this feature can be used to advantage for rapid updating of image features such as characters input by a user, drop-down menus etc. The controller can check whether an image update requires any gray to gray transitions; if not, the areas of the image which need rewriting can be rewritten using the rapid monochrome update mode. Thus, a user can have fast updating of input characters, drop-down menus and other user-interaction features of the display seamlessly superimposed upon a slower updating of a general grayscale image.

As discussed in the aforementioned copending applications Ser. Nos. 09/561,424 and 09/520,743, in many electro-optic media, especially particle-based electrophoretic media, it is desirable that the drive scheme used to drive such media be direct current (DC) balanced, in the sense that, over an extended period, the algebraic sum of the currents passed through a specific pixel should be zero or as close to zero as possible, and the drive schemes of the present invention should be designed with this criterion in mind. More specifically, look-up tables used in the present invention should be designed so that any sequence of transitions beginning and ending in one extreme optical state (black or white) of a pixel should be DC balanced. From what has been said above, it might at first appear that such DC balancing may not be achievable, since the impulse, and thus the current through the pixel, required for any particular gray to gray transition is substantially constant. However, this is only true to a first approximation, and it has been found empirically that, at least in the case of particle-based electrophoretic media (and the same appears to be true of other electro-optic media), the effect of (say) applying five spaced 50 msec pulses to a pixel is not the same as applying one 250 msec pulse of the same voltage. Accordingly, there is some flexibility in the current which is passed through a pixel to achieve a given transition, and this flexibility can be used to assist in achieving DC balance. For example, the look-up table used in the present invention can store multiple impulses for a given transition, together with a value for the total current provided by each of these impulses, and the controller can maintain, for each pixel, a register arranged to store the algebraic sum of the impulses applied to the pixel since some prior time (for example, since the pixel was last in a black state). When a specific pixel is to be driven from a white or gray state to a black state, the controller can examine the register associated with that pixel, determine the current required to DC balance the overall sequence of transitions from the previous black state to the forthcoming black state, and choose the one of the multiple stored impulses for the white/gray to black transition needed which will either accurately reduce the associated register to zero, or at least to as small a remainder as possible (in which case the associated register will retain the value of this remainder and add it to the currents applied during later transitions). It will be apparent that repeated applications of this process can achieve accurate long term DC balancing of each pixel.

It should be noted that the sawtooth drive scheme shown in FIGS. 11A and 11B is well adapted for use of such a DC balancing technique, in that this drive scheme ensures that only a limited number of transitions can elapse between successive passes of any given pixel through the black state, and indeed that on average a pixel will pass through the black state on one-half of its transitions.

The objectionable effects of reset steps may be further reduced by using local rather than global updating, i.e., by rewriting only those portions of the display which change between successive images, the portions to be rewritten being chosen on either a "local area" or a pixel-by-pixel basis. For example, it is not uncommon to find a series of images in which relatively small objects move against a larger static background, as for example in diagrams illustrating movement of parts in mechanical devices or diagrams used in accident reconstruction. To use local updating, the controller needs to compare the final image with the initial image and determine which area(s) differ between the two images and thus need to be rewritten. The controller may identify one or more local areas, typically rectangular areas having sides aligned with the pixel grid, which contain pixels which need to be updated, or may simply identify individual pixels which need to be updated. Any of the drive scheme already described may then be applied to update only the local areas or individual pixels thus identified as needing rewriting. Such a local updating scheme can substantially reduce the energy consumption of a display.

The aforementioned drive schemes may be varied in numerous ways depending upon the characteristics of the specific electro-optic display used. For example, in some cases it may be possible to eliminate many of the reset steps in the drives schemes described above. For example, if the electro-optic medium used is bistable for long periods (i.e., the gray levels of written pixels change only very slowly with time) and the impulse needed for a specific transition does not vary greatly with the period for which the pixel has been in its initial gray state, the look-up table may be arranged to effect gray state to gray state transitions directly without any intervening, return to a black or white state, resetting of the display being effected only when, after a substantial period has elapsed, the gradual "drift" to pixels from their nominal gray levels could have caused noticeable errors in the image presented. Thus, for example, if a user was using a display of the present invention as an electronic book reader, it might be possible to display numerous screens of information before resetting of the display were necessary; empirically, it has been found that with appropriate waveforms and drivers, as many as 1000 screens of information can be displayed before resetting is necessary, so that in practice resetting would not be necessary during a typical reading session of an electronic book reader.

It will readily be apparent to those skilled in display technology that a single apparatus of the present invention could usefully be provided with a plurality of different drive schemes for use under differing conditions. For example, since in the drive schemes shown in FIGS. 9 and 10, the reset pulses consume a substantial fraction of the total energy consumption of the display, a controller might be provided with a first drive scheme which resets the display at frequent intervals, thus minimizing gray scale errors, and a second scheme which resets the display only at longer intervals, thus tolerating greater gray scale errors but reduce energy consumption. Switching between the two schemes can be effected either manually or dependent upon external parameters; for example, if the display were being used in a laptop computer, the first drive scheme could be used when the computer is running on mains electricity, while the second could be used while the computer was running on internal battery power.

From the foregoing description, it will be seen that the present invention provides a driver for controlling the operation of electro-optic displays, which are well adapted to the characteristics of bistable particle-based electrophoretic displays and similar displays.

From the foregoing description, it will also be seen that the present invention provides a method and controller for controlling the operation of electro-optic displays which allow accurate control of gray scale without requiring inconvenient flashing of the whole display to one of its extreme states at frequent intervals. The present invention also allows for accurate control of the display despite changes in the temperature and operating time thereof, while lowering the power consumption of the display. These advantages can be achieved inexpensively, since the controller can be constructed from commercially available components.

In the remnant voltage method of the present invention, measurement of the remnant voltage is desirably effected by a high impedance voltage measurement device, for example a metal oxide semiconductor (MOS) comparator. When the display is one having small pixels, for example a 100 dots per inch (DPI) matrix display, in which each pixel has an area of $10^{-4}$ square inch or about $6 \times 10^{-2}$ mm$^2$, the comparator needs to have an ultralow input current, as the resistance of such a single pixel is of the order of $10^{12}$ ohm. However, suitable comparators are readily available commercially; for example, the Texas Instruments INA111 chip is suitable, as it has an input current on only about 20 pA. (Technically, this integrated circuit is an instrumentation amplifier, but if its output is routed into a Schmitt trigger, it acts as a comparator.) For displays having large single pixels, such as large direct-drive displays (defined below) used in signage, where the individual pixels may have areas of several square centimeters, the requirements for the comparator are much less stringent, and almost any commercial FET input comparator may be used, for example the LF311 comparator from National Semiconductor Corporation.

It will readily be apparent to those skilled in the art of electronic displays that, for cost and other reasons, massproduced electronic displays will normally have drivers in the form of application specific integrated circuits (ASIC's), and in this type of display the comparator would typically be provided as part of the ASIC. Although this approach would require provision of feedback circuitry within the ASIC, it would have the advantage of making the power supply and oscillator sections of the ASIC simpler and smaller in area. If tri-level general image flow drive is required, this approach would also make the driver section of the ASIC simpler and smaller in area. Thus, this approach would typically reduce the cost of the ASIC.

Conveniently, a driver which can apply a driving voltage, electronically short or float the pixel, is used to apply the driving pulses. When using such a driver, on each addressing cycle where DC balance correction is to be effected, the pixel is addressed, electronically shorted, then floated. (The term "addressing cycle" is used herein in its conventional meaning in the art of electro-optic displays to refer to the total cycle needed to change from a first to a second image on the display. As noted above, because of the relatively low switching speeds of electrophoretic displays, which are typically of the order of tens to hundreds of milliseconds, a single addressing cycle may comprise a plurality of scans of the entire display.) After a short delay time, the comparator is used to measure the remnant voltage across the pixel, and to determine whether it is positive or negative in sign. If the remnant voltage is positive, the controller may slightly extend the duration of (or slightly increase the voltage of) negative-going addressing pulses on the next addressing cycle. If, however, the remnant voltage is negative, the controller may slightly extend the duration of (or slightly increase the voltage of) positive-going voltage pulses on the next addressing cycle.

Thus, the remnant voltage method of the invention places the electro-optic medium into a bang-bang feedback loop, adjusting the length of the addressing pulses to drive the remnant voltage toward zero. When the remnant voltage is near zero, the medium exhibits ideal performance and improved lifetime. In particular, use of the present invention may allow improved control of gray scale. As noted earlier, it has been observed that the gray scale level obtained in electro-optic displays is a function not only of the starting gray scale level and the impulse applied, but also of the previous states of the display. It is believed (although this invention is in no way limited by this belief) that one of the reasons for this "history" effect on gray scale level is that the remnant voltage affects the electric field experienced by the electro-optic medium; the actual electric field influencing the behavior of the medium is the sum of the voltage actually applied via the electrodes and the remnant voltage. Thus, controlling the remnant voltage in accordance with the present invention ensures that the electric field experienced by the electro-optic medium accurately corresponds to that applied via the electrodes, thus permitting improved control of gray scale.

The remnant voltage method of the present invention is especially useful in displays of the so-called "direct drive" type, which are divided into a series of pixels each of which is provided with a separate electrode, the display further comprising switching means arranged to control independently the voltage applied to each separate electrode. Such direct drive displays are useful for the display of text or other limited character sets, for example numerical digits, and are described in, inter alia, the aforementioned International Application Publication No. 00/05704. However, the remnant voltage method of the present invention can also be used with other types of displays, for example active matrix displays which use an array of transistors, at least one of which is associated with each pixel of the display. Activating the gate line of a thin film transistor (TFT) used in such an active matrix display connects the pixel electrode to the source electrode. The remnant voltage is small compared to the gate voltage (the absolute value of the remnant voltage typically does not exceed about 0.5 V), so the gate drive voltage will still turn the TFT on. The source line can then be electronically floated and connected to a MOS comparator, thus allowing reading the remnant voltage of each individual pixel of the active matrix display.

It should be noted that, although the remnant voltage on a pixel of an electrophoretic display does closely correlate with the extent to which the current flow through that pixel has been DC-balanced, zero remnant voltage does not necessarily imply perfect DC-balance. However, from the practical point of view, this makes little difference, since it appears to be the remnant voltage itself rather than the DC-balance history which is responsible for the adverse effects noted herein.

It will readily be apparent to those skilled in the display art that, since the purpose of the remnant voltage method of the present invention is to reduce remnant voltage and DC imbalance, this method need not be applied on every addressing cycle of a display, provided it is applied with sufficient frequency to prevent a long-term build-up of DC imbalance at a particular pixel. For example, if the display is one which requires use of a "refresh" or "blanking" pulse at intervals, such that during the refresh or blanking pulse all of the pixels are driven to the same display state, normally one of the extreme display states (or, more commonly, all of the pixels are first driven to one extreme display state, and then to the other extreme display state), the method of the present invention might be practiced only during the refresh or blanking pulses.

Although the remnant voltage method of the invention has primarily been described in its application to encapsulated electrophoretic displays, this method may be also be used with unencapsulated electrophoretic displays, and with other types of display, for example electrochromic displays, which display a remnant voltage.

From the foregoing description, it will be seen that the remnant voltage method of the present invention provides a method for driving electrophoretic and other electro-optic displays which reduces the cost of the equipment needed to ensure DC balancing of the pixels of the display, while providing increasing display lifetime, operating window and long-term display optical performance.

Numerous changes and modifications can be made in the preferred embodiments of the present invention already described without departing from the spirit and skill of the invention. Accordingly, the foregoing description is to be construed in an illustrative and not in a limitative sense.

What is claimed is:

1. A method of driving a bistable electro-optic display having a plurality of pixels, each of which is capable of displaying at least three gray levels, the method comprising:

storing a look-up table containing data representing the impulses necessary to convert an initial gray level to a final gray level;

storing data representing at least an initial state of each pixel of the display;

storing data representing at least one prior state of each pixel prior to said initial state thereof, receiving an input signal representing a desired final state of at least one pixel of the display; and generating an output signal representing the impulse necessary to convert the initial state of said one pixel to the desired final state thereof, as determined from said look-up table, wherein said output signal is generated dependent upon both said at least one prior state and said initial state of said one pixel.

2. A method according to claim 1 wherein data is stored representing at least two prior states of each pixel and said output signal is generated dependent upon said at least two prior states and said initial state of said one pixel.

3. A method according to claim 1 further comprising receiving a temperature signal representing the temperature of at least one pixel of the display and generating said output signal dependent upon said temperature signal.

4. A method according to claim 3 wherein said look-up table stores multiple values for each transition from an initial gray level to a final gray level, said multiple values representing the values required for a specific transition at a specific temperature.

5. A method according to claim 4 further comprising interpolating between adjacent values for a transition when the temperature signal indicates a temperature intermediate the temperatures to which said adjacent values relate.

6. A method according to claim 3 wherein said look-up table stores functions of temperature, and wherein said output signal is generated by calculating the value of the relevant function at the temperature indicated by said temperature signal.

7. A method according to claim 1 wherein said output signal represents the period of time for which a substantially constant drive voltage is to be applied to said pixel.

8. A method according to claim 7 wherein said pixel is driven in a scan comprising a plurality of sub-scan periods and said output signal determines during which of said sub-scan periods a drive voltage is to be applied to said pixel.

9. A method according to claim 1 wherein said output signal comprises at least one polarity bit representing the polarity of the impulse necessary to convert the initial state of said one pixel to the desired final state thereof.

10. A method according to claim 1 wherein there is applied to said one pixel in succession a pre-pulse which drives said one pixel to one of its extreme optical states, and an addressing pulse which drives said one pixel from said one extreme optical state to the desired final state.

11. A method according to claim 10 wherein the pixels of the display are divided into first and second groups and different pre-pulses are applied to the first and second groups so that the pre-pulse drives the first group of pixels to one extreme optical state and the second group of pixels to the opposed extreme optical state.

12. A method according to claim 1 wherein there is applied to said one pixel in succession a first pre-pulse which drives said one pixel to one of its extreme optical states, a second pre-pulse which drives said one pixel from said one extreme optical state to the opposed extreme optical state, and an addressing pulse which drives said one pixel from said opposed extreme optical state to the desired final state.

13. A method according to claim 1 wherein the display is an electrophoretic display.

14. A method according to claim 13 wherein the display is an encapsulated electrophoretic display.

15. A method according to claim 1 wherein the display is a microcell display comprising charged particles and a suspending fluid retained within a plurality of cavities formed in a carrier medium.

16. A method according to claim 1 wherein the display is a passive matrix display.

17. A method of driving a bistable electro-optic display having a plurality of pixels, each of which is capable of displaying at least three gray levels, the method comprising:
storing a look-up table containing data representing the impulses necessary to convert an initial gray level to a final gray level;
storing data representing at least an initial state of each pixel of the display;
receiving an input signal representing a desired final state of at least one pixel of the display;
generating a lifetime signal representing the operating time of said one pixel; and
generating an output signal representing the impulse necessary to convert the initial state of said one pixel to the desired final state thereof, as determined from said look-up table, said output signal being generated dependent upon said lifetime signal.

18. A method according to claim 17 wherein there is applied to said one pixel in succession a pre-pulse which drives said one pixel to one of its extreme optical states, and an addressing pulse which drives said one pixel from said one extreme optical state to the desired final state.

19. A method according to claim 18 wherein the pixels of the display are divided into first and second groups and different pre-pulses are applied to the first and second groups so that the pre-pulse drives the first group of pixels to one extreme optical state and the second group of pixels to the opposed extreme optical state.

20. A method according to claim 17 wherein there is applied to said one pixel in succession a first pre-pulse which drives said one pixel to one of its extreme optical states, a second pre-pulse which drives said one pixel from said one extreme optical state to the opposed extreme optical state, and an addressing pulse which drives said one pixel from said opposed extreme optical state to the desired final state.

21. A method according to claim 17 wherein the display is an electrophoretic display.

22. A method according to claim 21 wherein the display is an encapsulated electrophoretic display.

23. A method according to claim 17 wherein the display is a microcell display comprising charged particles and a suspending fluid retained within a plurality of cavities formed in a carrier medium.

24. A method according to claim 17 wherein the display is a passive matrix display.

25. A method of driving a bistable electro-optic display having a plurality of pixels, each of which is capable of displaying at least three gray levels, the method comprising:
storing a look-up table containing data representing the impulses necessary to convert an initial gray level to a final gray level;
storing data representing at least an initial state of each pixel of the display;
receiving an input signal representing a desired final state of at least one pixel of the display;
generating a residence time signal representing the time since said one pixel underwent a transition; and
generating an output signal representing the impulse necessary to convert the initial state of said one pixel to the desired final state thereof, as determined from said look-up table, said output signal being generated dependent upon said residence time signal.

26. A method according to claim 25 wherein there is applied to said one pixel in succession a pre-pulse which drives said one pixel to one of its extreme optical states, and an addressing pulse which drives said one pixel from said one extreme optical state to the desired final state.

27. A method according to claim 26 wherein the pixels of the display are divided into first and second groups and different pre-pulses are applied to the first and second groups so that the pre-pulse drives the first group of pixels to one extreme optical state and the second group of pixels to the opposed extreme optical state.

28. A method according to claim 25 wherein there is applied to said one pixel in succession a first pre-pulse which drives said one pixel to one of its extreme optical states, a second pre-pulse which drives said one pixel from said one extreme optical state to the opposed extreme optical state, and an addressing pulse which drives said one pixel from said opposed extreme optical state to the desired final state.

29. A method according to claim 25 wherein the display is an electrophoretic display.

30. A method according to claim 29 wherein the display is an encapsulated electrophoretic display.

31. A method according to claim 25 wherein the display is a microcell display comprising charged particles and a suspending fluid retained within a plurality of cavities formed in a carrier medium.

32. A method according to claim 25 wherein the display is a passive matrix display.

33. A device controller for controlling a bistable electro-optic display having a plurality of pixels, each of which is capable of displaying at least three gray levels, said controller comprising:

storage means arranged to store both a look-up table containing data representing the impulses necessary to convert an initial gray level to a final gray level, and data representing at least an initial state of each pixel of the display, said storage means also being arranged to store data representing a least one prior state of each pixel prior to said initial state thereof;

input means for receiving an input signal representing a desired final state of at least one pixel of the display;

calculation means for determining, from the input signal, the stored data representing the initial and prior states of said pixel, and the look-up table, the impulse required to change the initial state of said one pixel to the desired final state; and output means for generating an output signal representative of said impulse.

34. A controller according to claim 33 wherein said storage means is arranged to store data representing at least two prior states of each pixel, and said calculation means is arranged to determine said impulse dependent upon said input signal, said initial state of said pixel and said at least two prior states of said pixel.

35. A controller according to claim 33 wherein said output means generates a signal representing the time for which a substantially constant drive voltage is to be applied to said pixel.

36. A controller according to claim 33 wherein said output signal comprises at least one polarity bit representing the polarity of said impulse.

37. A controller according to claim 33 wherein said output means is arranged to generate in succession a pre-pulse which drives one pixel of its associated display to one of its extreme optical states, and an addressing pulse which drives said one pixel from said one extreme optical state to the desired final state.

38. A controller according to claim 33 wherein said output means is arranged to generate in succession a pre-pulse which drives one pixel of its associated display to one of its extreme optical states, a second pre-pulse which drives said one pixel from said one extreme optical state to the opposed extreme optical state, and an addressing pulse which drives said one pixel from said one extreme optical state to the desired final state.

39. A bistable electro-optic display having a plurality of pixels, each of which is capable of displaying at least three gray levels, and a controller according to claim 33 arranged to control the electro-optic display.

40. A device controller for controlling a bistable electro-optic display having a plurality of pixels, each of which is capable of displaying at least three gray levels, said controller comprising:

storage means arranged to store both a look-up table containing data representing the impulses necessary to convert an initial gray level to a final gray level, and data representing at least an initial state of each pixel of the display, input means for receiving an input signal representing a desired final state of at least one pixel of the display, said input means also being arranged to receive a temperature signal representing the temperature of at least one pixel of the display;

calculation means for determining, from the input signal, the stored data representing the initial state of said pixel, said temperature signal, and the look-up table, the impulse required to change the initial state of said one pixel to the desired final state; and output means for generating an output signal representative of said impulse.

41. A controller according to claim 40 wherein said storage means is arranged to store multiple values for the impulses necessary to convert an initial gray level to a final gray level, said multiple values representing the values required for a specific transition at a specific temperature.

42. A controller according to claim 41 wherein said calculation means is arranged to interpolate between adjacent ones of said stored multiple values when said temperature signal indicates a temperature intermediate the temperatures to which said adjacent stored values relate.

43. A controller according to claim 40 wherein said storage means is arranged to store functions of temperature, and said calculation means is arranged to determine said impulse by calculating the value of the relevant function at the temperature represented by said temperature signal.

44. A controller according to claim 40 wherein said output means is arranged to generate in succession a pre-pulse which drives one pixel of its associated display to one of its extreme optical states, and an addressing pulse which drives said one pixel from said one extreme optical state to the desired final state.

45. A controller according to claim 40 wherein said output means is arranged to generate in succession a pre-pulse which drives one pixel of its associated display to one of its extreme optical states, a second pre-pulse which drives said one pixel from said one extreme optical state to the opposed extreme optical state, and an addressing pulse which drives said one pixel from said one extreme optical state to the desired final state.

46. A bistable electro-optic display having a plurality of pixels, each of which is capable of displaying at least three gray levels, and a controller according to claim 40 arranged to control the electro-optic display.

47. A device controller for controlling a bistable electro-optic display having a plurality of pixels, each of which is capable of displaying at least three gray levels, said controller comprising:

storage means arranged to store both a look-up table containing data representing the impulses necessary to convert an initial gray level to a final gray level, and data representing at least an initial state of each pixel of the display, input means for receiving an input signal representing a desired final state of at least one pixel of the display;

lifetime signal generation means arranged to generate a lifetime signal representing the operating time of said pixel calculation means for determining, from the input signal, the stored data representing the initial state of said pixel, said lifetime signal, and the look-up table, the impulse required to change the initial state of said one pixel to the desired final state; and output means for generating an output signal representative of said impulse.

48. A controller according to claim 42 wherein said output means is arranged to generate in succession a pre-pulse which drives one pixel of its associated display to one of its extreme optical states, and an addressing pulse which drives said one pixel from said one extreme optical state to the desired final state.

49. A controller according to claim 42 wherein said output means is arranged to generate in succession a pre-pulse which drives one pixel of its associated display to one of its extreme optical states, a second pre-pulse which drives said one pixel from said one extreme optical state to the opposed extreme optical state, and an addressing pulse which drives said one pixel from said one extreme optical state to the desired final state.

50. A bistable electro-optic display having a plurality of pixels, each of which is capable of displaying at least three gray levels, and a controller according to claim 47 arranged to control the electro-optic display.

51. A device controller for controlling a bistable electro-optic display having a plurality of pixels, each of which is capable of displaying at least three gray levels, said controller comprising:

storage means arranged to store both a look-up table containing data representing the impulses necessary to convert an initial gray level to a final gray level, and data representing at least an initial state of each pixel of the display, input means for receiving an input signal representing a desired final state of at least one pixel of the display;

residence time signal generation means for determining the residence time since said one pixel last underwent a transition and for generating a residence time signal representing said residence time;

calculation means for determining, from the input signal, the stored data representing the initial state of said pixel, said residence time signal, and the look-up table, the impulse required to change the initial state of said one pixel to the desired final state; and output means for generating an output signal representative of said impulse.

52. A controller according to claim 51 wherein said output means is arranged to generate in succession a pre-pulse which drives one pixel of its associated display to one of its extreme optical states, and an addressing pulse which drives said one pixel from said one extreme optical state to the desired final state.

53. A controller according to claim 51 wherein said output means is arranged to generate in succession a pre-pulse which drives one pixel of its associated display to one of its extreme optical states, a second pre-pulse which drives said one pixel from said one extreme optical state to the opposed extreme optical state, and an addressing pulse which drives said one pixel from said one extreme optical state to the desired final state.

54. A bistable electro-optic display having a plurality of pixels, each of which is capable of displaying at least three gray levels, and a controller according to claim 51 arranged to control the electro-optic display.

55. A device controller comprising:

storage means arranged to store both a look-up table containing data representing the impulses necessary to convert an initial gray level to a final gray level, and data representing at least an initial state of each pixel of the display;

input means for receiving an input signal representing a desired final state of at least one pixel of the display;

calculation means for determining, from the input signal, the stored data representing the initial state of said pixel, and the look-up table, the impulse required to change the initial state of said one pixel to the desired final state; and output means for generating an output signal representative of said impulse, the output signal representing a plurality of pulses varying in at least one of voltage and duration, the output signal representing a zero voltage after the expiration of a predetermined period of time.

56. A controller according to claim 55 wherein said output means is arranged to generate in succession a pre-pulse which drives one pixel of its associated display to one of its extreme optical states, and an addressing pulse which drives said one pixel from said one extreme optical state to the desired final state.

57. A controller according to claim 55 wherein said output means is arranged to generate in succession a pre-pulse which drives one pixel of its associated display to one of its extreme optical states, a second pre-pulse which drives said one pixel from said one extreme optical state to the opposed extreme optical state, and an addressing pulse which drives said one pixel from said one extreme optical state to the desired final state.

58. A bistable electro-optic display having a plurality of pixels, each of which is capable of displaying at least three gray levels, and a controller according to claim 55 arranged to control the electro-optic display.

59. A driver circuit comprising:

output lines arranged to be connected to drive electrodes of an electro-optic display;

first input means for receiving a plurality of 2-bit numbers representing the voltage and polarity of signals to be placed on the drive electrodes; and second input means for receiving a clock signal, the driver circuit being arranged such that, upon receipt of the clock signal, the driver circuit displays voltages selected from R+V, R and R−V on its output lines, where R is a reference voltage and V is the maximum difference from the reference voltage which the driver circuit can assert.

60. A method for driving an electro-optic display having a remnant voltage, the method comprising:

(a) applying a first driving pulse to a pixel of the display;

(b) measuring the remnant voltage of the pixel after the first driving pulse; and (c) applying a second driving pulse to the pixel following the measurement of the remnant voltage, the magnitude of the second driving pulse being controlled dependent upon the measured remnant voltage to reduce the remnant voltage of the pixel.

61. A method according to claim 60 wherein the display is of the direct drive type having a plurality of pixels each of which is provided with a separate electrode, the display further comprising switching means arranged to control independently the voltage applied to each electrode.

62. A method according to claim 60 wherein the display comprises a plurality of pixels and there is applied to the display at intervals a blanking pulse which drives all the pixels of the display to substantially the same display state, and measurement of the remnant voltage is effected after such a blanking pulse.

63. A method according to claim 60 wherein the display is an electrophoretic display.

64. A method according to claim 63 wherein the display is an encapsulated electrophoretic display.

65. A method according to claim 60 wherein the display is a microcell display comprising charged particles and a suspending fluid retained within a plurality of cavities formed in a carrier medium.

66. A method according to claim 60 wherein the display is a passive matrix display.

* * * * *